(12) United States Patent
Sun

(10) Patent No.: US 12,503,903 B2
(45) Date of Patent: Dec. 23, 2025

(54) SYSTEM FOR CONTROLLING OPENING OF APERTURE TUBE DOOR

(71) Applicant: Illinois Tool Works Inc., Glenview, IL (US)

(72) Inventor: Yuan Sun, Shanghai (CN)

(73) Assignee: Illinois Tool Works Inc., Glenview, IL (US)

( * ) Notice: Subject to any disclaimer, the term of this patent is extended or adjusted under 35 U.S.C. 154(b) by 390 days.

(21) Appl. No.: 18/090,237

(22) Filed: Dec. 28, 2022

(65) Prior Publication Data

US 2023/0243203 A1    Aug. 3, 2023

(30) Foreign Application Priority Data

Jan. 29, 2022    (CN) .................. 202210111215.5

(51) Int. Cl.
*E05F 15/70*    (2015.01)
*B60L 53/16*    (2019.01)
*B60Q 1/00*    (2006.01)
*B60Q 9/00*    (2006.01)

(52) U.S. Cl.
CPC .............. *E05F 15/70* (2015.01); *B60L 53/16* (2019.02); *B60Q 1/0017* (2013.01); *B60Q 1/0035* (2013.01); *B60Q 9/00* (2013.01); *E05Y 2400/30* (2013.01); *E05Y 2400/44* (2013.01); *E05Y 2900/534* (2013.01)

(58) Field of Classification Search
CPC ..... E05F 15/70; B60Q 1/0017; B60Q 1/0035; B60Q 9/00; E05Y 2400/30; E05Y 2400/44; E05Y 2900/534

USPC .......................................................... 700/275
See application file for complete search history.

(56) References Cited

U.S. PATENT DOCUMENTS

| 11,216,175 | B2* | 1/2022 | Washeleski | ......... G06F 3/04886 |
| 2010/0296303 | A1* | 11/2010 | Sarioglu | ................. E05B 17/10 |
| | | | | 362/487 |
| 2013/0268141 | A1* | 10/2013 | Du | .......................... G06F 17/00 |
| | | | | 701/2 |
| 2017/0050744 | A1* | 2/2017 | Bredemeier | ....... B64D 45/0018 |
| 2019/0152433 | A1* | 5/2019 | Cumbo | .............. G07C 9/00714 |
| 2021/0198080 | A1* | 7/2021 | Lewis | .................... B66B 5/0006 |
| 2023/0184025 | A1* | 6/2023 | Park | ........................ B60L 53/16 |

* cited by examiner

*Primary Examiner* — Md Azad
(74) *Attorney, Agent, or Firm* — McAndrews, Held & Malloy, Ltd.

(57) ABSTRACT

A system for controlling opening of an aperture tube door, including a control component, a detection component, a sensing area and an indication component. The detection component is connected to the control component, and the indication component is connected to the control component. When detecting the sensing signal from the sensing area, the detection component sends out activation signal. When the activation signal has been received, the control component sends to the indication component indication control signal to control the indication component to send out aperture tube door status prompt, and the control component sends out a driving control signal configured to open the aperture tube door. A user can know that his/her touch or press has been detected through the status prompt sent by the indication component, so that the internal structure of the aperture tube door or aperture tube assembly will not be damaged.

20 Claims, 16 Drawing Sheets

SYSTEM FOR CONTROLLING OPENING OF APERTURE TUBE DOOR

CROSS-REFERENCE

The present application claims the benefit of Chinese Patent Application No. 202210111215.5 filed Jan. 29, 2022, titled "System for Controlling Opening of Aperture Tube Door," the contents of which are hereby incorporated by reference.

TECHNICAL FIELD

The present disclosure relates to a system for controlling opening of an aperture tube door, and in particular to a system for controlling opening of a charging port door or an oil filler port door.

BACKGROUND

An aperture tube assembly includes an aperture tube, and an aperture tube door that can be opened and closed. When the aperture tube door is open, a user can perform relevant operations on the aperture tube. The aperture tube assembly includes a charging port or an oil filler port. For example, the charging port includes a charging aperture tube and a charging door (a charging port door). The charging aperture tube has an opening, and the charging door is movable to open and close the opening of the charging aperture tube. When the charging door moves to open the opening of the charging aperture tube, the user can insert a charging head into the opening of the charging aperture tube to charge a vehicle.

SUMMARY

The present disclosure relates generally to a system for controlling opening of aperture tube door, substantially as illustrated by and described in connection with at least one of the figures, as set forth more completely in the claims.

BRIEF DESCRIPTION OF THE DRAWINGS

The foregoing and other objects, features, and advantages of the devices, systems, and methods described herein will be apparent from the following description of particular examples thereof, as illustrated in the accompanying figures; where like or similar reference numbers refer to like or similar structures. The figures are not necessarily to scale, emphasis instead being placed upon illustrating the principles of the devices, systems, and methods described herein.

DETAILED DESCRIPTION

Figure 1:
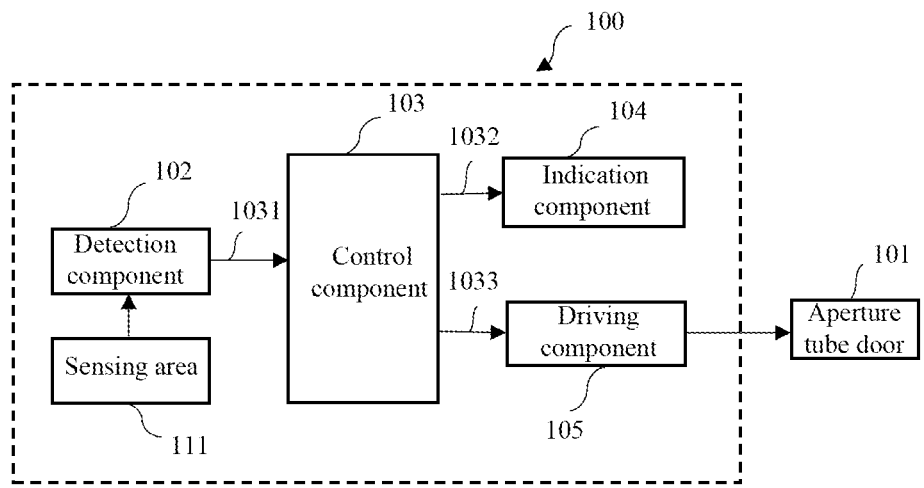
FIG. 1 shows a block diagram of functional modules of a first embodiment of a system for controlling opening of an aperture tube door according to the present disclosure.

Various specific implementations of the present disclosure will be described below with reference to the accompanying drawings which constitute part of this description. It should be understood that, where possible, the same or similar reference signs used in the present disclosure refer to the same components.

Through observation, it has been realized that when a user performs a touch or press operation to open an aperture tube door, a driving component drives the aperture tube door to open. In actual use, the aperture tube door needs to be opened slowly to meet the needs of various uses, and this requirement will make the user believe that a detection component has not detected his/her touch or press and then repeatedly tap the aperture tube door, so that it is likely to cause damage to the aperture tube door and the internal structure thereof.

In order to solve the above problem, a sensing area, a detection component and an indication component are additionally provided in the present disclosure. When the user touches the sensing area in order to open the aperture tube door, the detection component can detect the touch to generate an activation signal and send the activation signal to a control component. When the activation signal has been received, the control component sends to the driving component a driving control signal to open the aperture tube door. In addition, when the activation signal has been received, the control component sends an indication control signal to the indication component, such that the indication component sends out a status prompt during opening of the aperture tube door, so as to notify the user that the touch or press has been detected.

The user can know, in a timely manner, that his/her touch or press has been detected through the status prompt sent by the indication component, so that the internal structure of the aperture tube door or an aperture tube assembly will not be damaged due to repeated tapping of the aperture tube door.

The status prompt includes a visual prompt or a sound prompt. The indication component may be arranged on or close to the aperture tube door. The control component can control a speed at which the driving component opens the aperture tube door. The sensing area may be arranged on or close to the aperture tube door. The aperture tube door may be a charging port door or an oil filler port door.

In an embodiment, the detection component, the indication component and the control component may be integrated. Therefore, the system of the present disclosure has a high degree of integration and a high space utilization rate.

In an embodiment, the indication component may also be used to provide lighting after the aperture tube door is opened, or to indicate that a vehicle is being charged or charging is completed.

According to an aspect of the present disclosure, there is provided a system for controlling opening of an aperture tube door, the system including a control component, a detection component, a sensing area and an indication component. The detection component is connected to the control component, and the indication component is connected to the control component. When detecting the sensing signal from the sensing area, the detection component sends out an activation signal. When the activation signal has been received, the control component sends to the indication component an indication control signal to control the indication component to send out an aperture tube door status prompt, and the control component sends out a driving control signal configured to open the aperture tube door.

In an embodiment, the system further includes a driving component connected to the control component. The control component sends to the driving component a driving control signal to control the driving component to open the aperture tube door.

In an embodiment, the system is for use in a vehicle, the vehicle including a vehicle body control component and a driving component. The control component sends a driving control signal to the vehicle body control component, and the vehicle body control component drives the driving component to open the aperture tube door according to the driving control signal.

In an embodiment, the aperture tube door status prompt includes a visual prompt or a sound prompt, and the aperture tube door status prompt can be sensed when the aperture tube door is in a closed position during actuation of the aperture tube door.

In an embodiment, the indication component includes a light emitting element or a sound element arranged on or close to the aperture tube door.

In an embodiment, the light emitting element includes at least one light emitting diode and a light guide band connected to the at least one light emitting diode.

In an embodiment, the light emitting element is arranged around the aperture tube door and is used to seal the aperture tube door, or the light emitting element is arranged around an aperture tube and is used to seal the aperture tube.

In an embodiment, the control component is configured to control a speed at which the driving component opens the aperture tube door.

In an embodiment, the sensing area is arranged on or close to the aperture tube door.

In an embodiment, the aperture tube door includes an oil filler port door or a charging port door.

In an embodiment, the detection component, the indication component and the control component are integrated.

In an embodiment, the system further includes a second detection component connected to the vehicle body control component. The second detection component is used for detecting opening of the aperture tube door and is arranged on the aperture tube door. The second detection component sends out a second activation signal when the opening of the aperture tube door is detected. When the second activation signal has been received, the vehicle body control component sends to the indication component a lighting control signal to control the indication component to provide lighting. The indication component provides lighting after the indication component sends out an aperture tube door status prompt.

In an embodiment, the system further includes a second detection component connected to the vehicle body control component. The second detection component is used for detecting driving of the driving component and is arranged on the driving component. The second detection component sends out a second activation signal when the driving of the driving component is detected. When the second activation signal has been received, the vehicle body control component sends to the indication component a lighting control signal to control the indication component to provide lighting. The indication component provides lighting after the indication component sends out an aperture tube door status prompt.

In an embodiment, the aperture tube door includes a charging port door. The system further includes a third detection component connected to the vehicle body control component, the third detection component being used for detecting a charging connection between a charging head and the charging port. The third detection component sends out a third activation signal when the charging connection between the charging head and the charging port is detected. When the third activation signal has been received, the vehicle body control component sends to the indication component an indication control signal to control the indication component to send out a charging prompt.

In an embodiment, the system further includes a fourth detection component connected to the vehicle body control component, the fourth detection component being used for detecting whether charging is completed. The fourth detection component sends out a fourth activation signal when it is detected that the charging has been completed. When the fourth activation signal has been received, the vehicle body control component sends to the indication component an indication control signal to control the indication component to send out a charging completion prompt.

According to another aspect of the present disclosure, there is provided a vehicle, including an aperture tube door, and the system for controlling opening of the aperture tube door as described above.

FIG. 1 shows a block diagram of functional modules of a first embodiment of a system 100 for controlling opening of an aperture tube door 101 according to the present disclosure. As shown in FIG. 1, in an embodiment, the system 100 includes a sensing area 111, a detection component 102, a control component 103 and an indication component 104. The detection component 102 is connected to the control component 103 via a connection line 1031, and the indication component 104 is connected to the control component 103 via a connection line 1032. The detection component 102 is used to detect the sensing signal from the sensing area 111.

In operation, when the aperture tube door 101 is to be opened, a user may touch or press the sensing area 111. In other embodiments, not limited to touch or press, sensing may be provided by other means. In an embodiment, the detection component 102 includes a capacitive sensor for detecting a user's touch on the sensing area 111. In another embodiment, the detection component 102 includes a pressure sensor for detecting a user's pressing on the sensing area 111. In other embodiments, the detection component 102 includes other forms of detection devices. When the detection component 102 detects the sensing signal from the sensing area 111, the detection component 102 generates an activation signal and sends to the control component 103 the activation signal through the connection line 1031. When the control component 103 receives the activation signal, the control component 103 sends to the indication component 104 an indication control signal through the connection line 1032 to control the indication component 104 to send out an aperture tube door status prompt. When the control component 103 receives the activation signal, the control component 103 further sends out a driving control signal configured to open the aperture tube door 101. In an embodiment, the control component 103 may simultaneously send out the indication control signal and the driving control signal. In other embodiments, the control component 103 may send out the indication control signal and the driving control signal in other suitable order. When the indication component 104 receives the indication control signal from the control component 103, the indication component 104 sends the aperture tube door status prompt to the user. Moreover, when a corresponding component receives the driving control signal from the control component 103, the component opens the aperture tube door 101.

During actuation of the aperture tube door 101, the aperture tube door status prompt can be sensed when the aperture tube door 101 is in a closed position. The aperture tube door status prompt includes prompting the user that the touch or press has been detected by the detection component 102. The user can know, in a timely manner, that his/her touch or press has been detected according to the aperture tube door status prompt sent by the indication component 104, so that the internal structure of the aperture tube door 101 or an aperture tube assembly will not be damaged due to repeated tapping of the aperture tube door 101.

The aperture tube door status prompt includes a visual prompt and/or a sound prompt. The user can sensitively perceive the visual and sound prompts, so he/she can know, in a timely and easy manner that his/her touch or press has been detected. The aperture tube door status prompt also includes other forms of prompts that can be perceived by the user in a timely and easy manner. In an embodiment, the indication component 104 includes a light emitting element for providing a visual prompt. In another embodiment, the indication component 104 includes a sound element for providing sound prompt. The sound element includes a speaker.

As shown in FIG. 1, in another embodiment, the system 100 further includes a driving component 105. The driving component 105 is connected to the control component 103 via a connection line 1033. In operation, when the detection component 102 detects the sensing signal (e.g., a user's touch or pressing) from the sensing area 111, the detection component 102 generates an activation signal and sends to the control component 103 the activation signal through the connection line 1031. When the control component 103 receives the activation signal, the control component 103 sends to the indication component 104 an indication control signal through the connection line 1032 to control the indication component 104 to send out an aperture tube door status prompt; and the control component 103 sends to the driving component 105 a driving control signal through the connection line 1033 to control the driving component 105 to open the aperture tube door 101. When the indication component 104 receives the indication control signal from the control component 103, the indication component 104 sends the aperture tube door status prompt to the user. When the driving component 105 receives the driving control signal from the control component 103, the driving component 105 drives the aperture tube door 101 to open.

Figure 2:
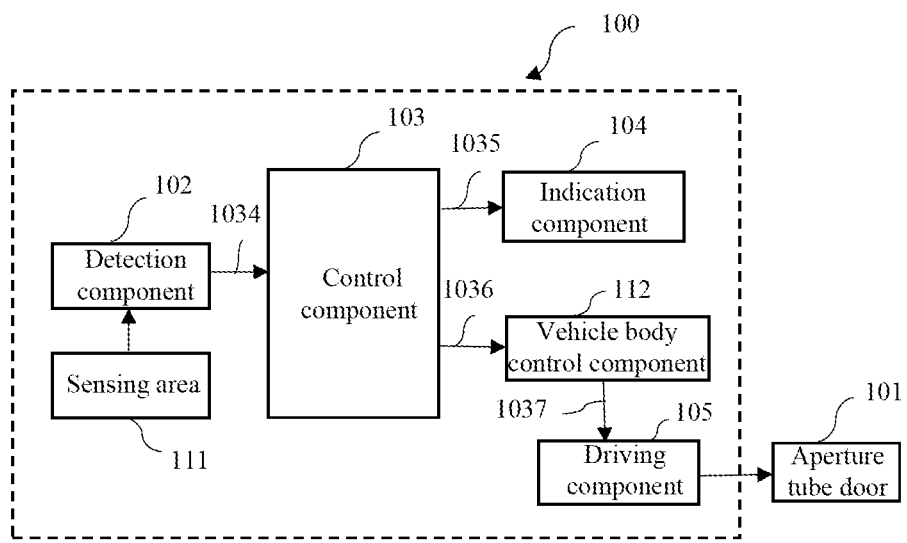
FIG. 2 shows a block diagram of functional modules of a second embodiment of a system for controlling opening of an aperture tube door according to the present disclosure.

FIG. 2 shows a block diagram of functional modules of a second embodiment of a system 100 for controlling opening of an aperture tube door 101 according to the present disclosure. As shown in FIG. 2, the system 100 includes a sensing area 111, a detection component 102, a control component 103 and an indication component 104. The detection component 102 is connected to the control component 103 via a connection line 1034, and the indication component 104 is connected to the control component 103 via a connection line 1035. The operations of the sensing area 111, the detection component 102, the control component 103 and the indication component 104 in FIG. 2 are substantially the same as those of the sensing area 111, the detection component 102, the control component 103 and the indication component 104 in FIG. 1. The difference is that, as shown in FIG. 2, the system 100 may be for use in a vehicle, the vehicle including a vehicle body control component 112 and a driving component 105. The vehicle body control component 112 is connected to the control component 103 via a connection line 1036, and the driving component 105 is connected to the vehicle body control component 112 via a connection line 1037.

In operation, when the detection component 102 detects the sensing (e.g., a user's touch or pressing) of the sensing area 111, the detection component 102 generates an activation signal and sends to the control component 103 the activation signal through the connection line 1034. When the control component 103 receives the activation signal, the control component 103 sends to the indication component 104 an indication control signal through the connection line 1035 to control the indication component 104 to send out an aperture tube door status prompt; and the control component 103 sends to the vehicle body control component 112 a driving control signal through the connection line 1036. When the vehicle body control component 112 receives the driving control signal, the vehicle body control component 112 generates a driving component control signal and sends to the driving component 105 the driving component control signal through the connection line 1037 to drive the driving component 105 to open the aperture tube door 101. When the driving component 105 receives the driving component control signal, the driving component 105 drives the aperture tube door 101 to open.

In another embodiment, the system 100 includes a vehicle body control component 112 and a driving component 105. The operations of the vehicle body control component 112 and the driving component 105 are substantially the same as those of the vehicle body control component 112 and the driving component 105 described above.

In FIGS. 1 and 2, in an embodiment, the indication component 104 may be arranged on the aperture tube door 101. In another embodiment, the indication component 104 is arranged close to the aperture tube door 101, for example on the aperture tube 109. The aperture tube door 101 and the aperture tube 109 constitute an aperture tube assembly 110 (see FIGS. 3A-D). The sensing area 111 is arranged on the aperture tube door 101, or close to the aperture tube door 101. In an embodiment, the detection component 102, the control component 103 and the indication component 104 are integrated.

Figure 3A:
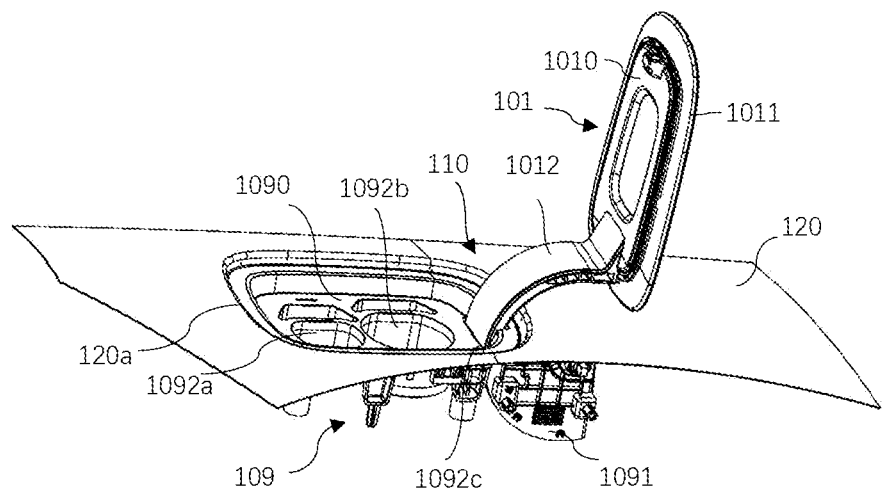
FIG. 3A shows a schematic diagram of an embodiment of an aperture tube assembly when mounted on a vehicle shell according to the present disclosure.
Figure 3B:
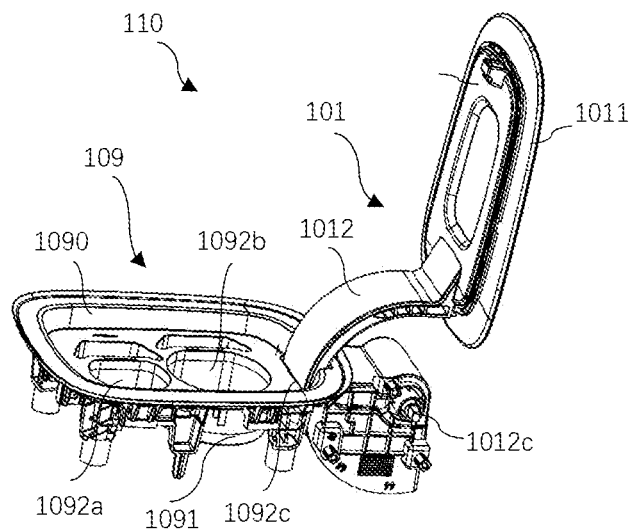
FIG. 3B shows a schematic diagram of an embodiment of an aperture tube assembly according to the present disclosure.
Figure 3C:
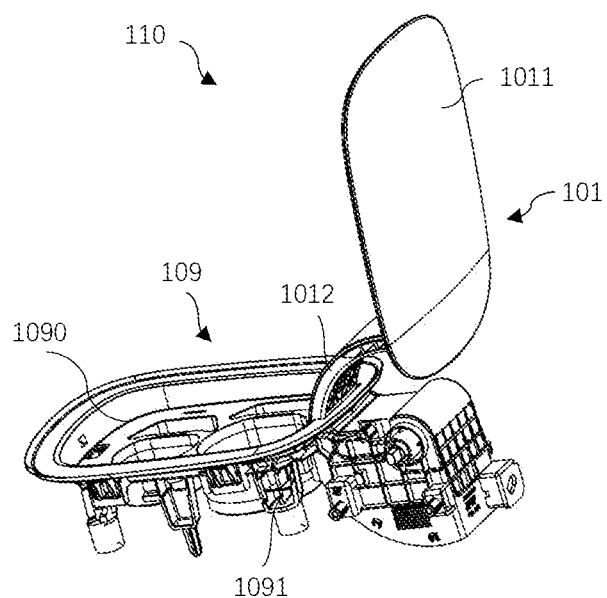
FIG. 3C shows a schematic diagram from another perspective of the aperture tube assembly in FIG. 3B.
Figure 3D:
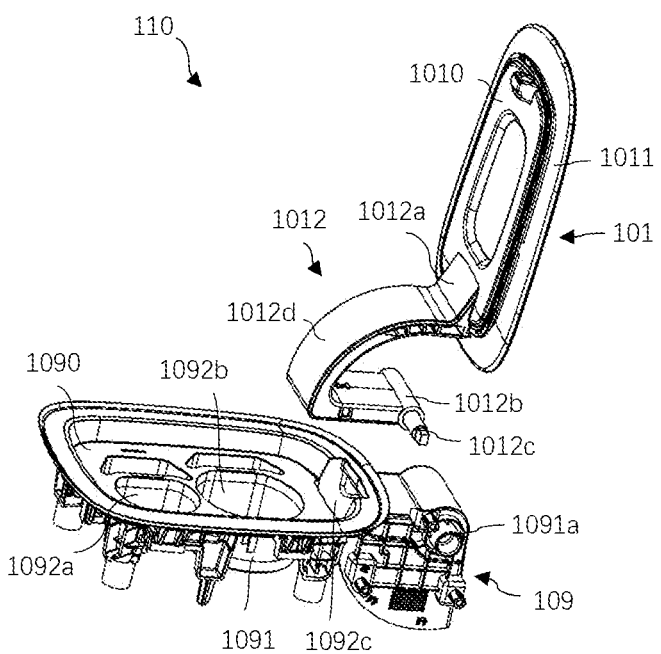
FIG. 3D shows an exploded view of the aperture tube assembly in FIG. 3B.

FIGS. 3A-D show schematic diagrams of an embodiment of an aperture tube assembly 110 according to the present disclosure, wherein FIG. 3A shows a schematic diagram of an embodiment of the aperture tube assembly 110 when mounted on a vehicle shell 120 according to the present disclosure, FIG. 3B shows a schematic diagram of an embodiment of the aperture tube assembly 110 according to the present disclosure, FIG. 3C shows a schematic diagram from another perspective of the aperture tube assembly 110 in FIG. 3B, and FIG. 3D shows an exploded view of the aperture tube assembly 110 in FIG. 3B.

As shown in FIGS. 3A-D, the aperture tube assembly 110 includes an aperture tube door 101 and an aperture tube 109. As shown in FIG. 3A, the aperture tube assembly 110 is mounted to an opening 120a on the vehicle shell 120. In an embodiment, the vehicle shell 120 is vehicle body sheet metal. In other embodiments, the vehicle shell 120 includes other forms of structures.

As shown in FIGS. 3B-D, the aperture tube 109 includes an upper panel 1090 and a main body 1091. The upper panel 1090 and the main body 1091 include openings 1092a, 1092b penetrating therethrough. The openings 1092a, 1092b include ports for oil filling or charging. For example, the user may insert a charging head into the openings 1092a, 1092b to charge the vehicle. The upper panel 1090 further includes an opening 1092c for allowing a hinge 1012 of the aperture tube door 101 to extend therethrough. One end of the hinge 1012 may be mounted to the main body 1091 of the aperture tube 109. The main body 1091 partially surrounds the hinge 1012. In other embodiments, the aperture tube 109 includes other forms of structures.

The aperture tube door 101 includes an inner panel 1010, an outer panel 1011 and the hinge 1012. The outer panel 1011 is coupled to the inner panel 1010, and the inner panel 1010 is coupled to the hinge 1012. The size of the outer panel 1011 is larger than that of the inner panel 1010, and the outer panel 1011 covers the inner panel 1010. In an embodiment, the outer panel 1011 is coupled together with the inner panel 1010 in a snap-fit manner, and the outer panel 1011 and the inner panel 1010 include matching snap fittings 1011a, 1010a (see FIGS. 4A-B). In other embodiments, the outer panel 1011 may be coupled to the inner panel 1010 by bonding, welding, etc.

The hinge 1012 includes a fixed end 1012a, a rotatable end 1012b, a rotating shaft 1012c and a main body 1012d. The fixed end 1012a is coupled to the inner panel 1010, and the main body 1012d of the hinge 1012 extends through the opening 1092c of the aperture tube 109 into the main body 1091 and is partially surrounded by the main body 1091 of the aperture tube 109. The rotatable end 1012b is mountable into the main body 1091 of the aperture tube 109, for example mounted in a barrel-shaped portion 1091a of the main body 1091. The rotatable end 1012b is coupled to the rotating shaft 1012c and rotates with the rotating shaft 1012c, and the rotating shaft 1012c is coupled to the driving component 105 (see FIG. 5). The driving component 105 is used to drive the rotating shaft 1012c to rotate, so that the fixed end 1012a coupled to the rotating shaft 1012c and the rotatable end 1012b rotate, and the inner panel 1010 and the outer panel 1011 coupled thereto (i.e., the aperture tube door 101) thus rotate. When the driving component 105 drives the rotation of the rotating shaft 1012c to rotate the aperture tube door 101 in a first direction (clockwise in FIG. 3B), the aperture tube door 101 is opened. When the driving component 105 drives the rotation of the rotating shaft 1012c to rotate the aperture tube door 101 in a second direction (counterclockwise in FIG. 3B) opposite to the first direction, the aperture tube door 101 is closed.

Figure 4A:
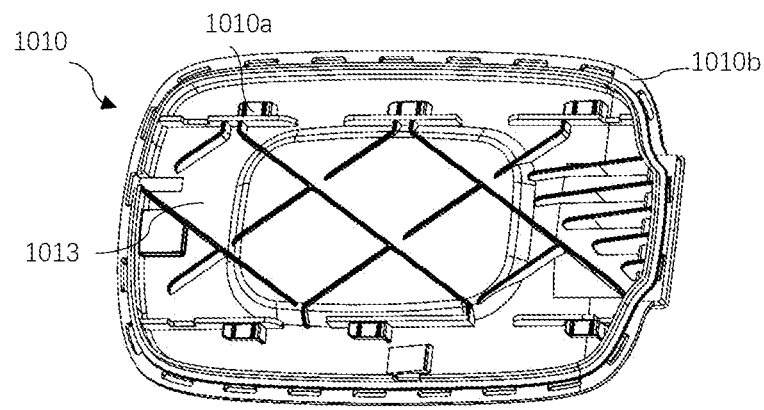
FIG. 4A shows a schematic diagram of an inner panel of the aperture tube door in FIGS. 3A-D.
Figure 4B:
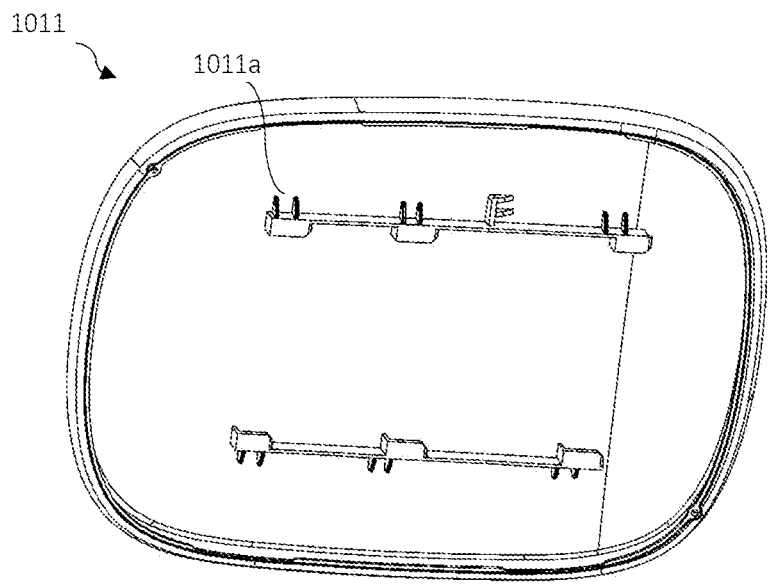
FIG. 4B shows a schematic diagram of an outer panel of the aperture tube door in FIGS. 3A-D.

FIGS. 4A-B show schematic diagrams of the aperture tube door 101 in FIGS. 3A-D, wherein FIG. 4A shows a schematic diagram of an inner panel 1010 of the aperture tube door 101 in FIGS. 3A-D, and FIG. 4B shows a schematic diagram of an outer panel 1011 of the aperture tube door 101 in FIGS. 3A-D. As shown in FIG. 4A-B, the side of the inner panel 1010 facing the outer panel 1011 includes a snap fitting 1010a, and the side of the outer panel 1011 facing the inner panel 1010 includes a snap fitting 1011a. The snap fitting 1010a fits the snap fitting 1011a. The snap fitting 1010a and the snap fitting 1011a are snap-fitted together so that the inner panel 1010 and the outer panel 1011 are coupled together. When the inner panel 1010 and the outer panel 1011 are coupled together, there is an accommodation cavity 1013 between the inner panel 1010 and the outer panel 1011. The accommodation cavity 1013 may be used to accommodate the detection component 102, the indication component 104 and/or the control component 103. As shown in FIG. 4A, the inner panel 1010 includes an edge 1010b, and the indication component 104 may be arranged on the edge 1010b of the inner panel 1010 (see FIG. 6A). In other embodiments, the aperture tube door 101 includes other forms of structures.

Figure 5:
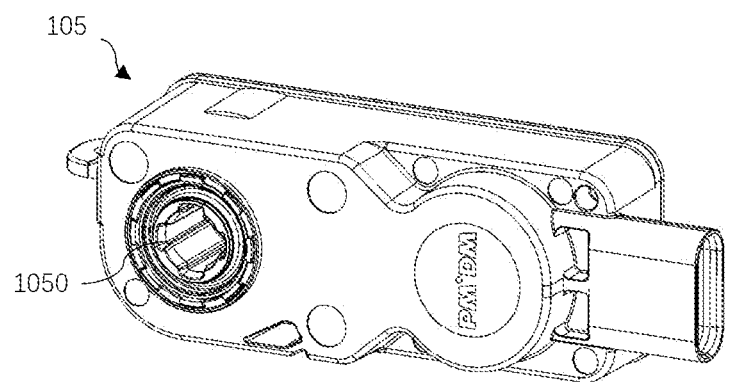
FIG. 5 shows a schematic diagram of an embodiment of a driving component according to the present disclosure.

FIG. 5 shows a schematic diagram of an embodiment of a driving component 105 according to the present disclosure. As shown in FIG. 5, the driving component 105 includes an actuator, which is coupled to the aperture tube door 101 and used to drive the aperture tube door 101 to open and close. In an embodiment, the actuator includes a motor and a gear assembly connected to the motor. The gear assembly is coupled to the rotating shaft 1012c of the aperture tube door 101 through a coupling opening 1050. The motor is used to drive the gear assembly to rotate, so as to drive the rotating shaft 1012c to rotate in the first direction and in the second direction opposite to the first direction. When the rotating shaft 1012c rotates in the first direction, the aperture tube door 101 is opened relative to the aperture tube 109, and when the rotating shaft 1012c rotates in the second direction opposite to the first direction, the aperture tube door 101 is closed relative to the aperture tube 109. The control component 103 or the vehicle body control component 112 sends to the motor a driving control signal to drive the motor to rotate the gear assembly, thereby opening and closing the aperture tube door 101. The driving control signal includes a pulse control signal. The gear assembly includes speed reducer gears, which are used to convert the high-speed rotation of the motor into the low-speed rotation of the gear assembly and then drive the rotating shaft 1012c to rotate at a low speed. The low-speed rotation of the rotating shaft 1012c makes the aperture tube door 101 open or close slowly. The speed at which the aperture tube door 101 is opened or closed may be controlled by adjusting the pulse control signal.

Figure 6A:
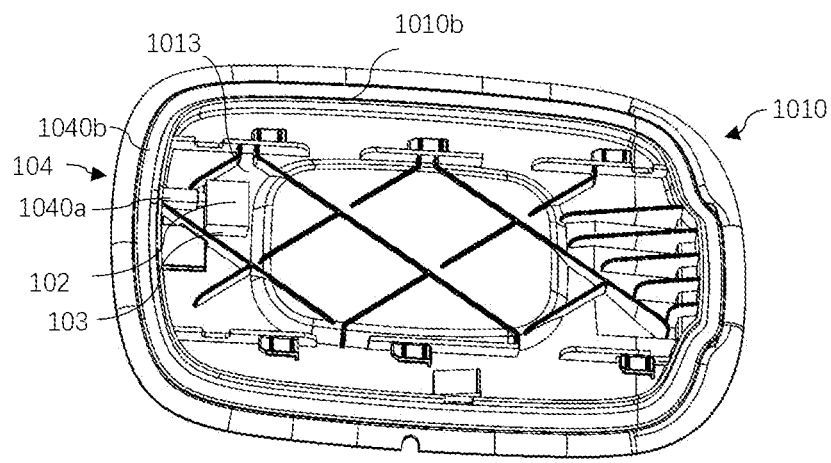
FIG. 6A shows a schematic diagram of the inner panel of the aperture tube door in a first position setting of a sensing area, a detection component, a control component and an indication component according to the present disclosure.
Figure 6B:
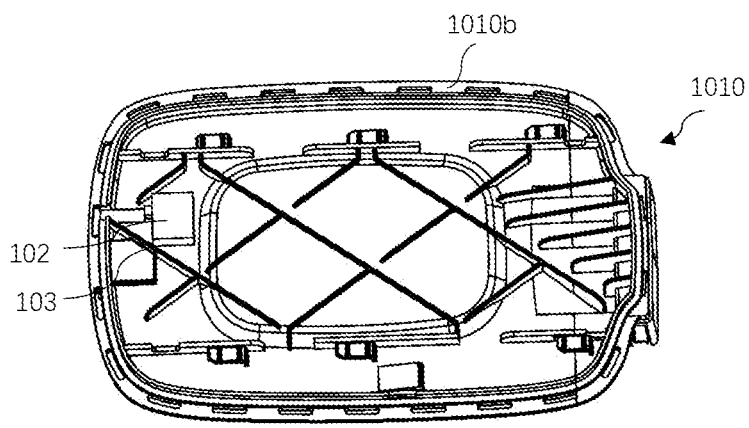
FIG. 6B shows an exploded view of FIG. 6A.
Figure 6B:
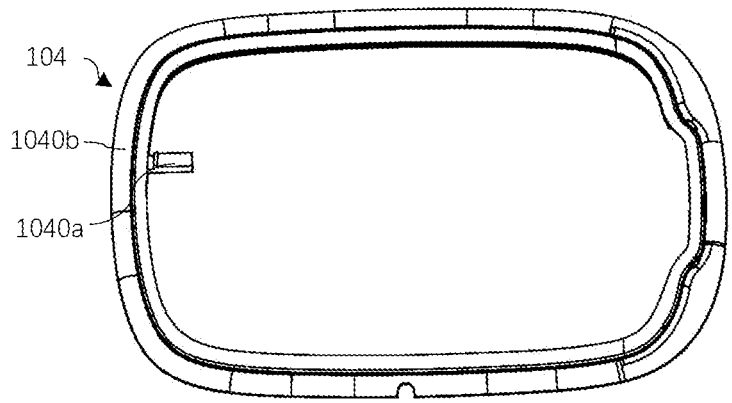
Figure 6C:
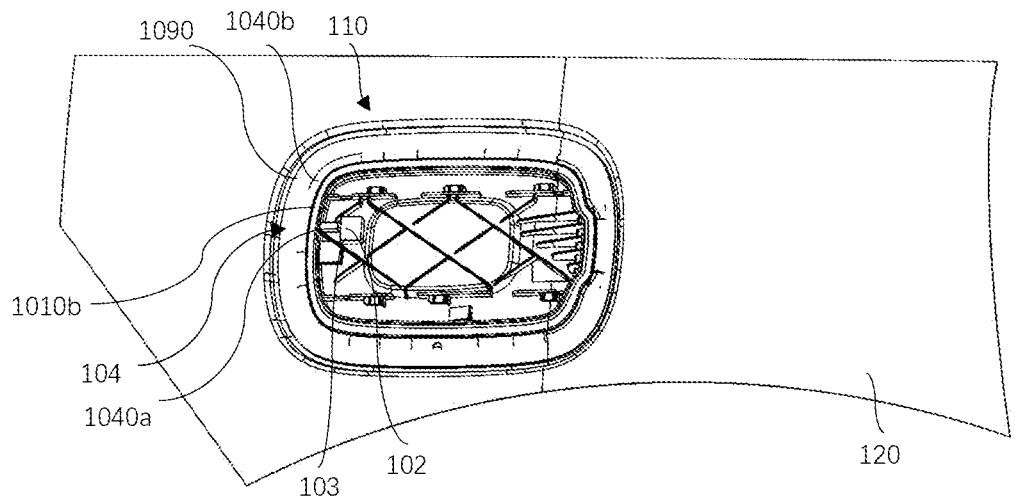
FIG. 6C shows a schematic diagram of an aperture tube assembly (with the outer panel of the aperture tube door removed) in the first position setting according to the present disclosure.
Figure 6D:
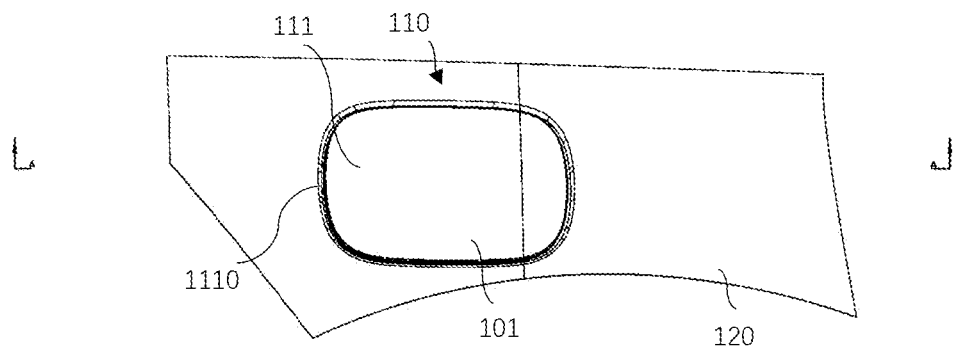
FIG. 6D shows a schematic diagram of the aperture tube assembly 10 mounted on the vehicle shell in the first position setting according to the present disclosure.
Figure 6E:
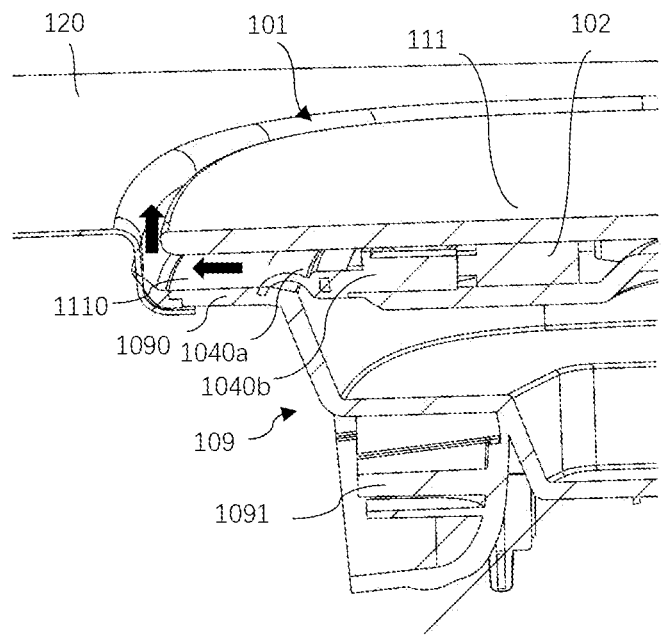
FIG. 6E shows a partial schematic cross-sectional view of FIG. 6D.

FIGS. 6A-E show schematic diagrams of an embodiment of a first position setting of a sensing area 111, a detection component 102, a control component 103 and an indication component 104 according to the present disclosure, wherein FIG. 6A shows a schematic diagram of an inner panel 1010 of an aperture tube door 101 in the first position setting according to the present disclosure, FIG. 6B shows an exploded view of FIG. 6A, FIG. 6C shows a schematic diagram of an aperture tube assembly 110 (with the outer panel 1011 of the aperture tube door 101 removed) in the first position setting according to the present disclosure, FIG. 6D shows a schematic diagram of the aperture tube assembly 110 mounted on the vehicle shell 120 in the first position setting according to the present disclosure, and FIG. 6E shows a partial schematic cross-sectional view of FIG. 6D. In FIGS. 6C-D, the aperture tube door 101 of the aperture tube assembly 110 is closed relative to the aperture tube 109. FIG. 6E is a schematic diagram taken along a cross-section line A-A of FIG. 6D. As shown in FIGS. 6A-E, the sensing area 111, the detection component 102, the control component 103 and the indication component 104 are arranged on the aperture tube door 101.

As shown in FIGS. 6A-E, the indication component 104 includes a light emitting element 1040. The light emitting element 1040 includes at least one light emitting diode 1040a and a light guide band 1040b connected to the at least one light emitting diode 1040a. The light guide band 1040b is arranged at the edge 1010b of the inner panel 1010 of the aperture tube door 101, and the light emitting diode 1040a is arranged adjacent to the light guide band 1040b. Specifically, the light guide band 1040b partially or completely surrounds the edge 1010b. The light emitting diode 1040a is arranged on the inner panel 1010, specifically arranged on the side of the inner panel 1010 facing the outer panel 1011, in the accommodation cavity 1013 between the inner panel 1010 and the outer panel 1011. The detection component 102 and the control component 103 are arranged adjacent to the light emitting diode 1040a. The detection component 102 and the control component 103 are integrated, for example integrated on a printed circuit board (PCB). In another embodiment, the light emitting diode 1040a (or the indication component 104), the detection component 102 and the control component 103 are integrated. The control component 103 is used for generating a control signal to light up at least one of the at least one light emitting diodes 1040a, and the illuminated light emitting diode 1040a projects light into the light guide band 1040b to illuminate the light guide band 1040b. The light guide band 1040b includes a light guide pipe. In other embodiments, the light emitting element 1040 includes other structures for emitting light. As shown in FIGS. 6D-E, when the aperture tube door 101 is closed relative to the aperture tube 109, the light emitted by the illuminated light guide band 1040b can pass through a gap 1110 and emit out of the aperture tube door 101 (see the arrow in FIG. 6E), to make it visible to the user. The gap 1110 is a space leading from the light guide band 1040b to the outside of the aperture tube door 101.

As shown in FIGS. 6C and 6E, the edge 1010b of the inner panel 1010 is adjacent to the upper panel 1090 of the aperture tube 109 when the aperture tube door 101 is closed relative to the aperture tube 109. The light guide band 1040b includes a light guide soft sealant, which is used to seal the edge 1010b of the inner panel 1010 and the part of the upper panel 1090 of the aperture tube 109 adjacent to the edge 1010b, so that sealing is provided between the inner panel 1010 of the aperture tube door 101 and the upper panel 1090 of the aperture tube 109 to prevent liquid from flowing into the aperture tube 109.

As shown in FIG. 6D, the sensing area 111 is an area on the outer panel 1011 of the aperture tube door 101, specifically an area on the side of the outer panel 1011 facing away from the inner panel 1010. The sensing area 111 is located above the detection component 102. In an embodiment, the detection component 102 is a capacitive sensor. When the user wants to open the aperture tube door 101, the user may touch the sensing area 111, for example, touch the sensing area 111 with a finger. When the user touches the sensing area 111, the detection component 102 below the sensing area 111 may detect the change of capacitance to detect the user's touch. When the detection component 102 detects the user's touch, the detection component 102 sends an activation signal to the control component 103. When the control component 103 receives the activation signal, the control component 103 sends to the indication component 104 an indication control signal to illuminate the light emitting diode 1040a and the light guide band 1040b, and the control component 103 sends out a driving control signal configured to open the aperture tube door 101. During the process that the aperture tube door 101 is driven to open, the user can see the light emitted by the illuminated light guide band 1040b when the aperture tube door 101 is in the closed position. In an embodiment, the control component 103 sends to the driving component 105 a driving control signal to drive the aperture tube door 101 to open. Since the user can know that the detection component 102 has detected the user's touch according to the light emitted by the light guide band 1040b, the user will not knock on the aperture tube door 101 due to misjudgment.

Figure 7A:
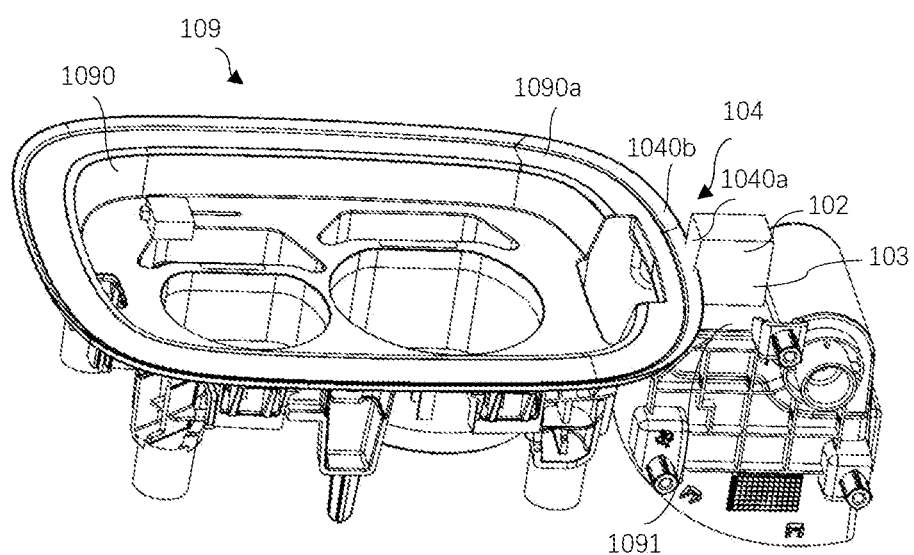
FIG. 7A shows a schematic diagram of an aperture tube in a second position setting of a sensing area, a detection component, a control component and an indication component according to the present disclosure.
Figure 7B:
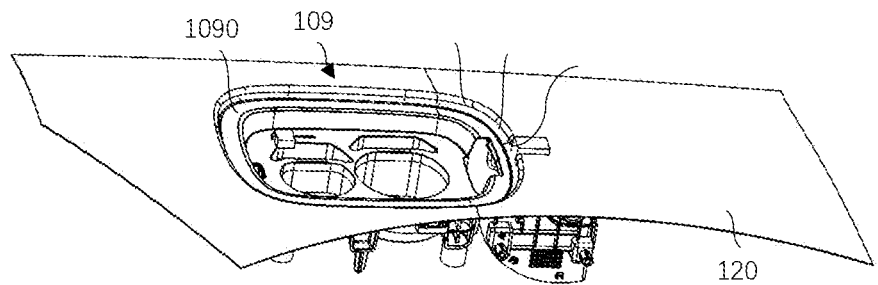
FIG. 7B shows a schematic diagram of the aperture tube mounted on the vehicle shell in the second position setting according to the present disclosure.
Figure 7C:
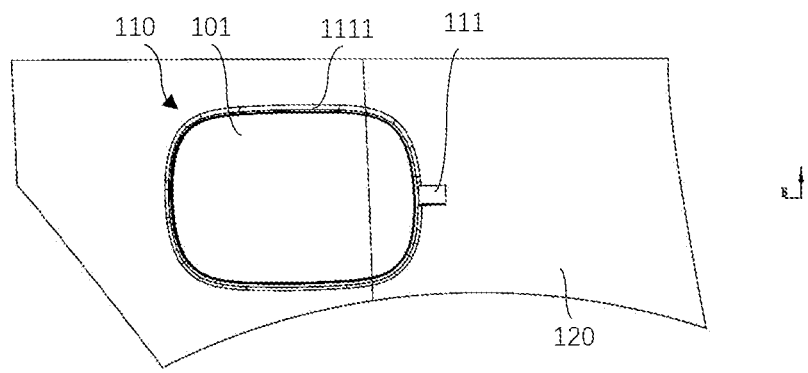
FIG. 7C shows a schematic diagram of an aperture tube assembly mounted on the vehicle shell in the second position setting according to the present disclosure.
Figure 7D:
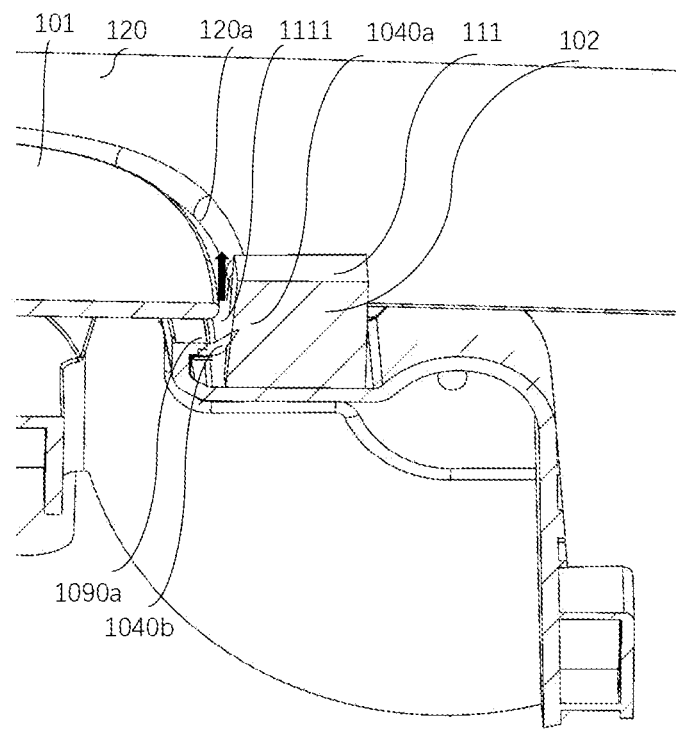
FIG. 7D shows a partial schematic cross-sectional view of FIG. 7C.

FIGS. 7A-D show schematic diagrams of an embodiment of a second position setting of a sensing area 111, a detection component 102, a control component 103 and an indication component 104 according to the present disclosure, wherein FIG. 7A shows a schematic diagram of an aperture tube 109 in the second position setting according to the present disclosure, FIG. 7B shows a schematic diagram of the aperture tube 109 mounted on the vehicle shell 120 in the second position setting according to the present disclosure, FIG. 7C shows a schematic diagram of an aperture tube assembly 110 mounted on the vehicle shell 120 in the second position setting according to the present disclosure, and FIG. 7D shows a partial schematic cross-sectional view of FIG. 7C. In FIGS. 7C, the aperture tube door 101 of the aperture tube assembly 110 is closed relative to the aperture tube 109. FIG. 7D is a schematic diagram taken along a cross-section line B-B of FIG. 7C. As shown in FIGS. 7A-D, the detection component 102, the control component 103 and the indication component 104 are arranged on the aperture tube 109, and the sensing area 111 is arranged above the detection component 102.

FIGS. 7A-D have a similar structures to those of FIG. 6A-D, the difference is that in FIGS. 7A-D, the light guide band 1040b in the indication component 104 is arranged at an edge 1090a of the upper panel 1090 of the aperture tube 109. Specifically, the light guide band 1040b partially or completely surrounds the edge 1090a. The light emitting diode 1040a, the detection component 102 and the control component 103 are integrally arranged adjacent to the light guide band 1040b and on the aperture tube 109, for example, on the main body 1091 of the aperture tube 109. As shown in FIGS. 7C-D, when the aperture tube door 101 is closed relative to the aperture tube 109, the light emitted by the illuminated light guide band 1040b can pass through a gap 1111 and emit out of the aperture tube door 101 (see the arrow in FIG. 7D), to make it visible to the user. The gap 1111 is a space leading from the light guide band 1040b to the outside of the aperture tube door 101.

As shown in FIGS. 7B and 7D, when the aperture tube assembly 110 is mounted on the vehicle shell 120, the edge 1090a of the upper panel 1090 of the aperture tube 109 is adjacent to the opening 120a of the vehicle shell 120. The light guide band 1040b includes a light guide soft sealant, which is used to seal the edge 1090a of the upper panel 1090 of the aperture tube 109 and the opening 120a of the vehicle shell 120, so that sealing is provided between the upper panel 1090 of the aperture tube 109 and the opening 120a of the vehicle shell 120 to prevent liquid from flowing from the opening 120a into the interior of the vehicle.

As shown in FIGS. 7A-B, the light emitting diode 1040a, the detection component 102 and the control component 103 are enclosed by a shell 121. The sensing area 111 is an area on the shell 121, specifically an area on an upper surface of the shell 121. The sensing area 111 is located above the detection component 102. In an embodiment, the detection component 102 is a capacitive sensor. When the user wants to open the aperture tube door 101, the user may touch the sensing area 111, for example, touch the sensing area 111 with a finger. When the user touches the sensing area 111, the detection component 102 below the sensing area 111 may detect the change of capacitance to detect the user's touch.

Figure 8A:
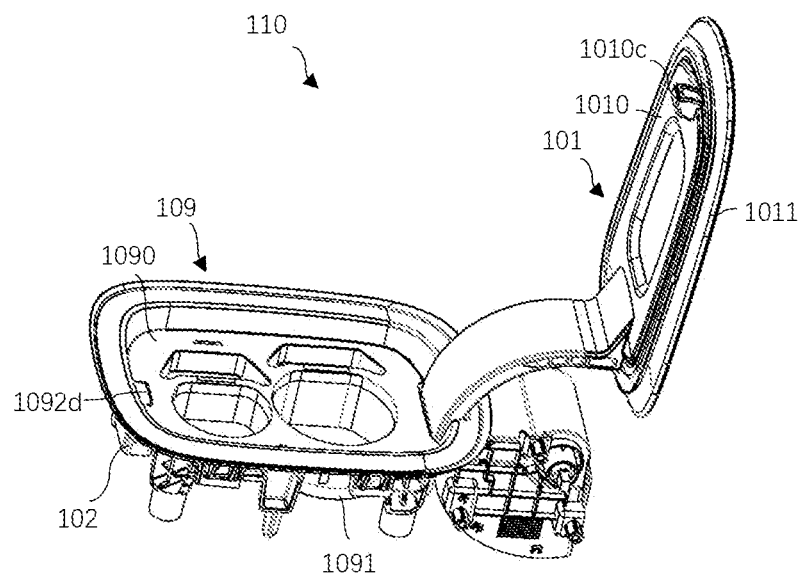
FIG. 8A shows a schematic diagram of an aperture tube assembly in a third position setting of a sensing area, a detection component, a control component and an indication component according to the present disclosure.
Figure 8B:
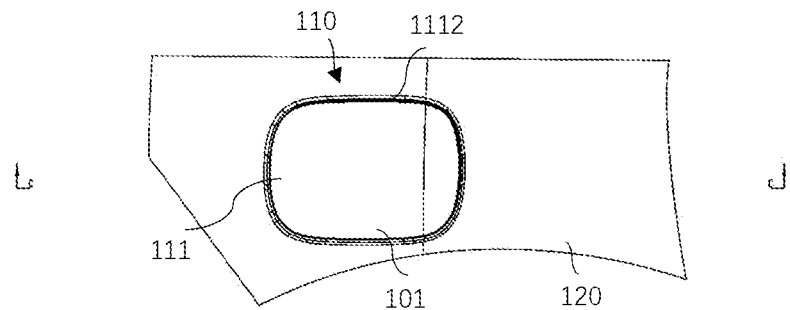
FIG. 8B shows a schematic diagram of the aperture tube assembly mounted on the vehicle shell in the third position setting according to the present disclosure.
Figure 8C:
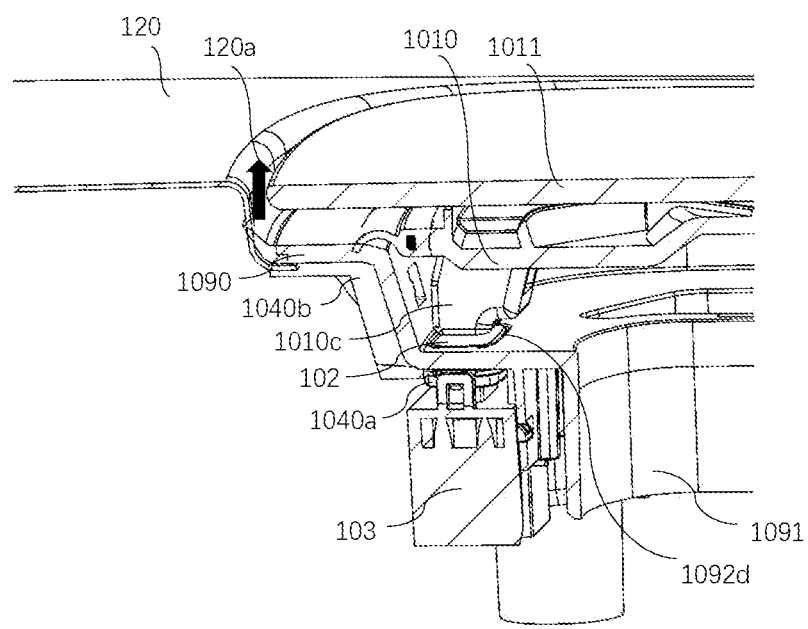
FIG. 8C shows a partial schematic cross-sectional view of FIG. 8B.

FIGS. 8A-C show schematic diagrams of an embodiment of a third position setting of a sensing area 111, a detection component 102, a control component 103 and an indication component 104 according to the present disclosure, wherein FIG. 8A shows a schematic diagram of an aperture tube assembly 110 in the third position setting according to the present disclosure, FIG. 8B shows a schematic diagram of the aperture tube assembly 110 mounted on the vehicle shell 120 in the third position setting according to the present disclosure, and FIG. 8C shows a partial schematic cross-sectional view of FIG. 8B. In FIG. 8A, the aperture tube door 101 of the aperture tube assembly 110 is opened relative to the aperture tube 109. In FIG. 8B, the aperture tube door 101 of the aperture tube assembly 110 is closed relative to the aperture tube 109. FIG. 8C is a schematic diagram taken along a cross-section line C-C of FIG. 8B.

As shown in FIGS. 8A-C, the sensing area 111 is arranged on the aperture tube door 101, and the detection component 102, the control component 103 and the indication component 104 are arranged on the aperture tube 109. The indication component 104 includes a light emitting element 1040. The light emitting element 1040 includes at least one light emitting diode 1040a and a light guide band 1040b connected to the at least one light emitting diode 1040a. The light guide band 1040b includes a light guide pipe. In other embodiments, the light emitting element 1040 includes other structures for emitting light. A protrusion 1010c is provided on the side of the inner panel 1010 of the aperture tube door 101 facing away from the outer panel 1011, and an opening 1092d is provided on the upper panel 1090 of the aperture tube 109. The protrusion 1010c on the aperture tube door 101 is aligned with the opening 1092d on the aperture tube 109 when the aperture tube door 101 is closed relative to the aperture tube 109. The sensing area 111 is an area on the outer panel 1011 of the aperture tube door 101, specifically an area on the side of the outer panel 1011 facing away from the inner panel 1010. The sensing area 111 is aligned with the protrusion 1010c. The detection component 102 is arranged in the opening 1092d of the aperture tube 109 and extends from the opening 1092d of the aperture tube 109 toward the main body 1091 of the aperture tube 109. In an embodiment, the detection component 102 is a pressure sensor. The light emitting diode 1040a and the control component 103 are arranged adjacent to the detection component 102, or the light emitting diode 1040a, the detection component 102 and the control component 103 are integrated. The light guide band 1040b is arranged next to the light emitting diode 1040a. Specifically, the light guide band 1040b is arranged below the upper panel 1090 of the aperture tube 109 and extends from the light emitting diode 1040a toward the edge 1090a of the upper panel 1090.

When the user wants to open the aperture tube door 101, the user may press the sensing area 111 on the outer panel 1011. When the user presses the sensing area 111, the protrusion 1010c on the inner panel 1010 of the aperture tube door 101 moves toward the detection component 102 in the opening 1092d on the aperture tube 109, so that the detection component 102 can detect the pressing operation of the user according to the displacement change of the protrusion 1010c. When the detection component 102 detects the user's pressing, the detection component 102 sends an activation signal to the control component 103. When the control component 103 receives the activation signal, the control component 103 generates an indication control signal to illuminate at least one of the at least one light emitting diodes 1040a. The illuminated light emitting diode 1040a projects light into the light guide band 1040b to illuminate the light guide band 1040b. Moreover, when the activation signal has been received, the control component 103 sends out a driving control signal configured to open the aperture tube door 101. During the process that the aperture tube door 101 is driven to open, the user can see the light emitted by the illuminated light guide band 1040b when the aperture tube door 101 is in the closed position. As shown in FIGS. 8B-C, when the aperture tube door 101 is closed relative to the aperture tube 109, the light emitted by the illuminated light guide band 1040b can pass through a gap 1112 and emit out of the aperture tube door 101 (see the arrow in FIG. 8D), to make it visible to the user. The gap 1112 is a space leading from the light guide band 1040b to the outside of the aperture tube door 101.

Figure 9:
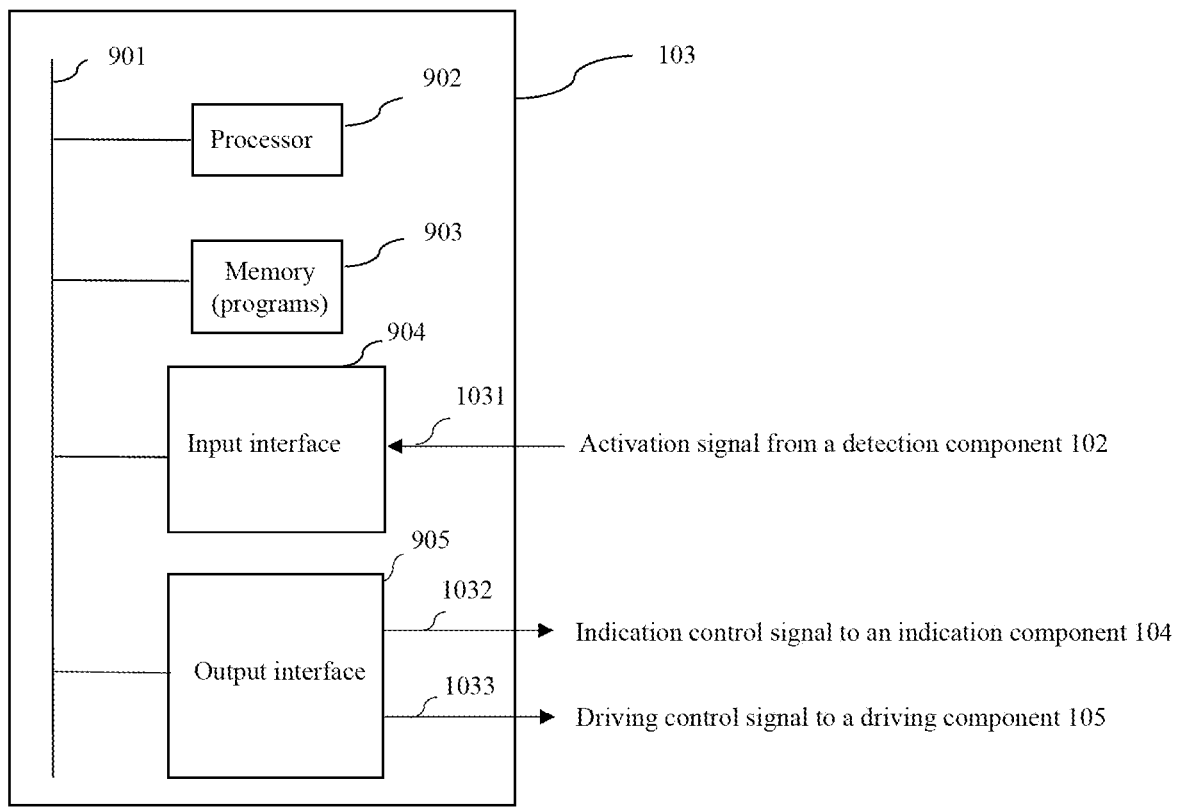
FIG. 9 shows a block diagram according to a control component shown in FIG. 1.

FIG. 9 shows a block diagram according to a control component 103 shown in FIG. 1. As shown in FIG. 9, the control component 103 includes a bus 901, a processor 902, a memory 903, an input interface 904, and an output interface 905. The processor 902, the memory 903, the input interface 904, and the output interface 905 are connected to the bus 901. The processor 902 may read programs (or instructions) from the memory 903 and execute the programs (or the instructions) to process data and control the indication component 104 and/or the driving component 105. The processor 902 may further write data or programs (or instructions) into the memory 903. The memory 903 may store the programs (instructions) or the data. By executing the instructions in the memory 903, the processor 902 can control the memory 903, the input interface 904, and the output interface 905. In an embodiment, the control component 103 may be a general control component of the vehicle, and further includes other processing and control functions.

When the detection component 102 detects that the user touches or presses the sensing area 111, the detection component 102 sends out an activation signal. The input interface 904 is configured to receive the activation signal from the detection component 102 through the connection line 1031. The processor 902 is configured to generate a first control signal according to the activation signal received from the detection component 102. The output interface 905 is configured to receive the first control signal from the processor 902, convert the first control signal into an indication control signal suitable for the indication component 104, and send to the indication component 104 the indication control signal through the connection line 1032. When the indication control signal has been received, the indication component 104 send outs an aperture tube door status indication.

The processor 902 is further configured to generate a second control signal according to the activation signal received from the detection component 102. The output interface 905 is configured to receive the second control signal from the processor 902 and convert the second control signal into a driving control signal. The driving control signal is used to open the aperture tube door 101. In another embodiment, the output interface 905 is configured to receive the second control signal from the processor 902, convert the second control signal into a driving control signal suitable for the driving component 105, and send to the driving component 105 the driving control signal through the connection line 1033. When the driving control signal has been received, the driving component 105 drives the aperture tube door 101 to open.

Figure 10:
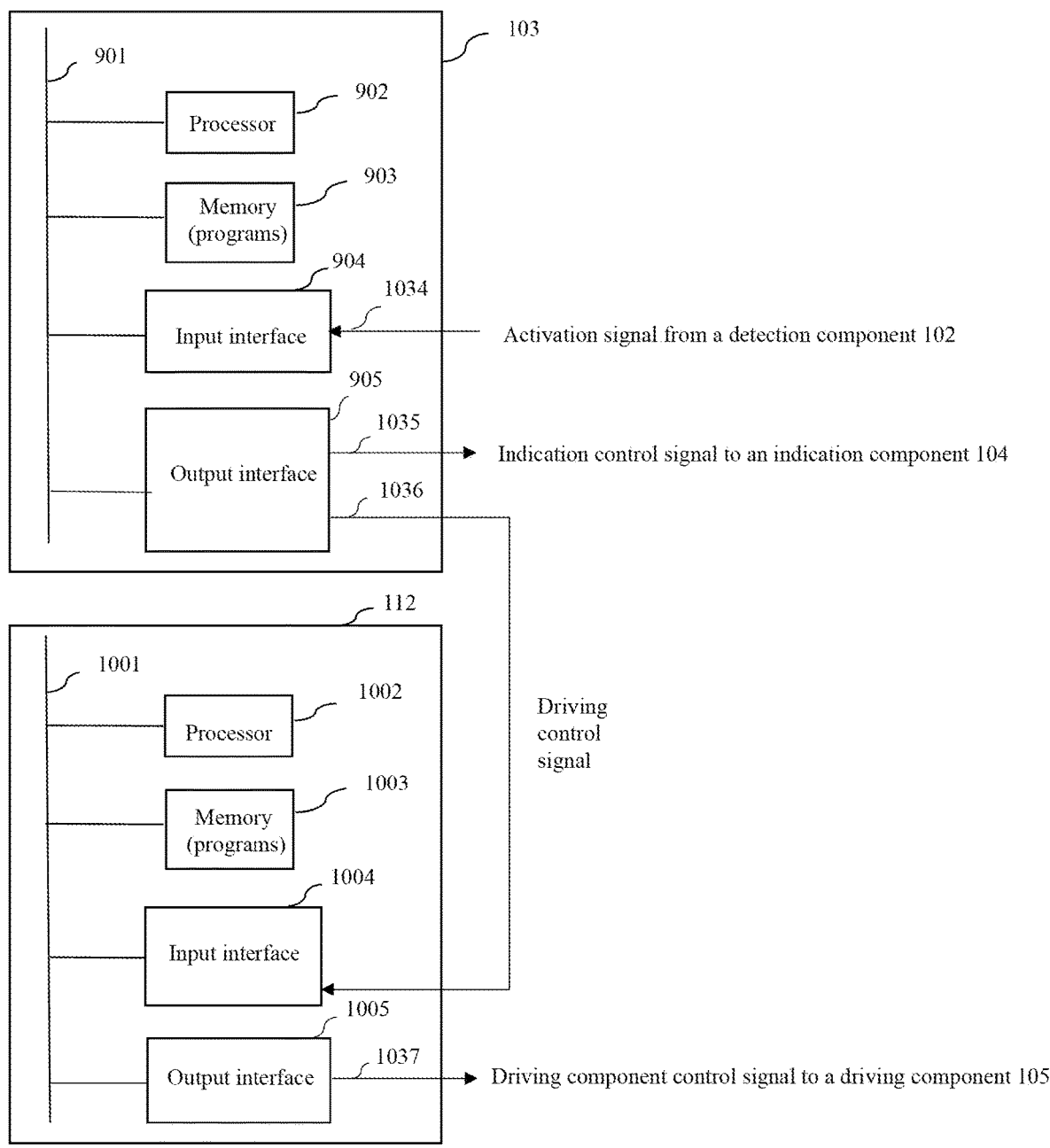
FIG. 10 shows a block diagram according to a control component and a vehicle body control component shown in FIG. 2.

FIG. 10 shows a block diagram according to a control component 103 and a vehicle body control component 112 shown in FIG. 2. As shown in FIG. 10, the control component 103 includes a bus 901, a processor 902, a memory 903, an input interface 904, and an output interface 905. The processor 902, the memory 903, the input interface 904, and the output interface 905 are connected to the bus 901. The processor 902 may read programs (or instructions) from the memory 903 and execute the programs (or the instructions) to process data and control the indication component 104 and the vehicle body control component 112. The processor 902 may further write data or programs (or instructions) into the memory 903. The memory 903 may store the programs (instructions) or the data. By executing the instructions in the memory 903, the processor 902 can control the memory 903, the input interface 904, and the output interface 905.

The vehicle body control component 112 includes a bus 1001, a processor 1002, a memory 1003, an input interface 1004, and an output interface 1005. The processor 1002, the memory 1003, the input interface 1004, and the output interface 1005 are connected to the bus 1001. The processor 1002 may read programs (or instructions) from the memory 1003 and execute the programs (or the instructions) to process data and control the driving component 105. The processor 1002 may further write data or programs (or instructions) into the memory 1003. The memory 1003 may store the programs (instructions) or the data. By executing the instructions in the memory 1003, the processor 1002 can control the memory 1003, the input interface 1004, and the output interface 1005.

In operation, when the detection component 102 detects that the user touches or presses the sensing area 111, the detection component 102 sends out an activation signal. The input interface 904 is configured to receive the activation signal from the detection component 102 through the connection line 1034. The processor 902 is configured to generate a first control signal according to the activation signal received from the detection component 102. The output interface 905 is configured to receive the first control signal from the processor 902, convert the first control signal into an indication control signal suitable for the indication component 104, and send to the indication component 104 the indication control signal through the connection line 1035. When the indication control signal has been received, the indication component 104 send outs an aperture tube door status indication. The processor 902 is further configured to generate a second control signal according to the activation signal received from the detection component 102. The output interface 905 is configured to receive the second control signal from the processor 902, convert the second control signal into a driving control signal suitable for the vehicle body control component 112, and send to the vehicle body control component 112 the driving control signal through the connection line 1036.

The input interface 1004 of the vehicle body control component 112 is configured to receive the driving control signal from the control component 103 through the connection line 1036. The processor 1002 of the vehicle body control component 112 is configured to generate a third control signal according to the driving control signal received from the control component 103. The output interface 1005 of the vehicle body control component 112 is configured to receive the third control signal from the processor 1002, convert the third control signal into a driving component control signal suitable for the driving component 105, and send to the driving component 105 the driving component control signal through the connection line 1037. When the driving component control signal has been received, the driving component 105 drives the aperture tube door 101 to open.

Figure 11:
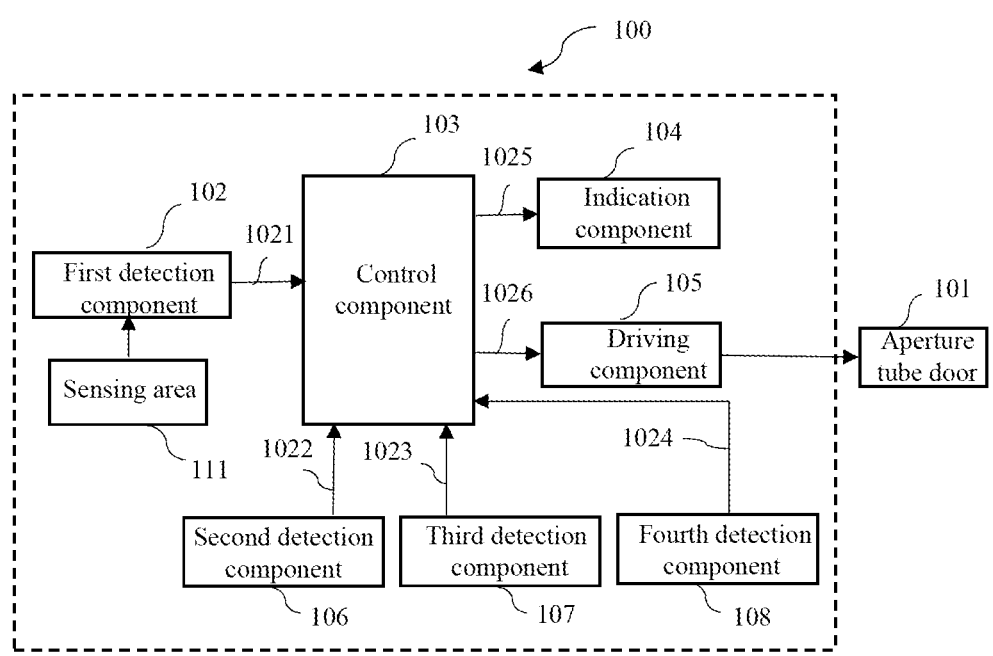
FIG. 11 shows a block diagram of functional modules of a third embodiment of a system for controlling opening of an aperture tube door according to the present disclosure.

FIG. 11 shows a block diagram of functional modules of a third embodiment of a system 100 for controlling opening of an aperture tube door 101 according to the present disclosure. As shown in FIG. 11, the system 100 includes a sensing area 111, a first detection component 102, a control component 103, an indication component 104 and a driving component 105. The first detection component 102 is connected to the control component 103 via a connection line 1021, the indication component 104 is connected to the control component 103 via a connection line 1025, and the driving component 105 is connected to the control component 103 via a connection line 1026. The operations of the sensing area 111, the first detection component 102, the control component 103, the indication component 104 and the driving component 105 in FIG. 11 are substantially the same as those of the sensing area 111, the detection component 102, the control component 103, the indication component 104 and the driving component 105 in FIG. 1. In operation, when the first detection component 102 detects the sensing signal (e.g., a user's touch or pressing) from the sensing area 111, the first detection component 102 generates an activation signal and sends to the control component 103 the activation signal through the connection line 1021. When the control component 103 receives the activation signal, the control component 103 sends to the indication component 104 an indication control signal through the connection line 1025 to control the indication component 104 to send out an aperture tube door status prompt; and the control component 103 sends to the driving component 105 a driving control signal through the connection line 1026 to control the driving component 105 to open the aperture tube door 101. When the indication component 104 receives the indication control signal from the control component 103, the indication component 104 sends the aperture tube door status prompt to the user. When the driving component 105 receives the driving control signal from the control component 103, the driving component 105 drives the aperture tube door 101 to open.

The difference from FIG. 1 is that the system 100 in FIG. 11 further includes a second detection component 106, a third detection component 107 and a fourth detection component 108. The second detection component 106 is connected to the control component 103 via a connection line 1022, the third detection component 107 is connected to the control component 103 via a connection line 1023, and the fourth detection component 108 is connected to the control component 103 via a connection line 1024. In an embodiment, the second detection component 106 is used to detect the opening of the aperture tube door 101. The second detection component 106 is arranged on the aperture tube door 101. The second detection component 106 includes a microswitch. When the aperture tube door 101 is opened, the microswitch is turned on to detect the opening of the aperture tube door 101. In another embodiment, the second detection component 106 is used to detect the driving of the driving component 105. The second detection component 106 is arranged on the driving component 105, for example, on a casing of a motor of the driving component 105. The second detection component 106 includes a Hall Effect sensor for detecting the rotation of the motor when the motor is operating. In an embodiment, the third detection component 107 includes a detection circuit for detecting whether a charging head is connected with a charging port. The fourth detection component 108 includes a detection circuit for detecting whether the charging of the vehicle is completed. In other embodiments, the second detection component 106, the third detection component 107 and the fourth detection component 108 include suitable devices or structures.

In operation, when the second detection component 106 detects that the aperture tube door 101 is opened, the second detection component 106 sends to the control component 103 a second activation signal through the connection line 1022. When the control component 103 receives the second activation signal, the control component 103 sends to the indication component 104 a lighting control signal through the connection line 1025 to control the indication component 104 to provide lighting. The indication component 104 provides lighting only after the indication component 104 sends out the aperture tube door status prompt, so that there is sufficient time for the user to acquire (sense) the aperture tube door status prompt. The indication component 104 may be used to provide lighting after a period of time interval from the time sending out the aperture tube door status prompt. The time interval is sufficient for the user to obtain the aperture tube door status prompt. In an embodiment, the indication component 104 illuminates the aperture tube 109 by emitting light, so that the user can use the aperture tube 109 to perform operations such as charging or oil filling at night. In an embodiment, a luminous brightness of the indication component 104 when providing lighting is higher than that of the indication component 104 when providing the aperture tube door status prompt. In another embodiment, when the second detection component 106 detects the driving of the driving component 105, the second detection component 106 sends a second activation signal to the control component 103. In other embodiments, the system 100 includes other components for providing lighting.

When the third detection component 107 detects that the charging head is connected with the charging port, the third detection component 107 sends to the control component 103 a third activation signal through the connection line 1023. When the control component 103 receives the third activation signal, the control component 103 sends to the indication component 104 an indication control signal through the connection line 1025 to control the indication component 104 to send out a charging prompt, for example, to prompt that charging is being performed. The control component 103 is used to control the light emitting diode 1040a in the indication component 104 to illuminate in a specific form, so that the light guide band 1040b is illuminated in a corresponding form. In an embodiment, the control component 103 controls the light emitting diode 1040a in the indication component 104 to illuminate on and off alternately, so that the light guide band 1040b is illuminated on and off alternately. In another embodiment, the control component 103 controls the light emitting diode 1040a and the light guide band 1040b in the indication component 104 to illuminate in a specific color, such as blue, or other colors. In other embodiments, the control component 103 controls the indication component 104 to emit light in other ways.

When the fourth detection component 108 detects that the charging is completed, the fourth detection component 108 sends to the control component 103 a fourth activation signal through the connection line 1024. When the control component 103 receives the fourth activation signal, the control component 103 sends to the indication component 104 an indication control signal through the connection line 1025 to control the indication component 104 to send out a charging completion prompt. Different from the way in which the indication component 104 provides a charging prompt, the control component 103 controls the indication component 104 to provide a charging completion prompt in another way. In an embodiment, the control component 103 controls the light emitting diode 1040a and the light guide band 1040b in the indication component 104 to illuminate in green. In other embodiments, the control component 103 controls the indication component 104 to emit light in other ways.

Figure 12:
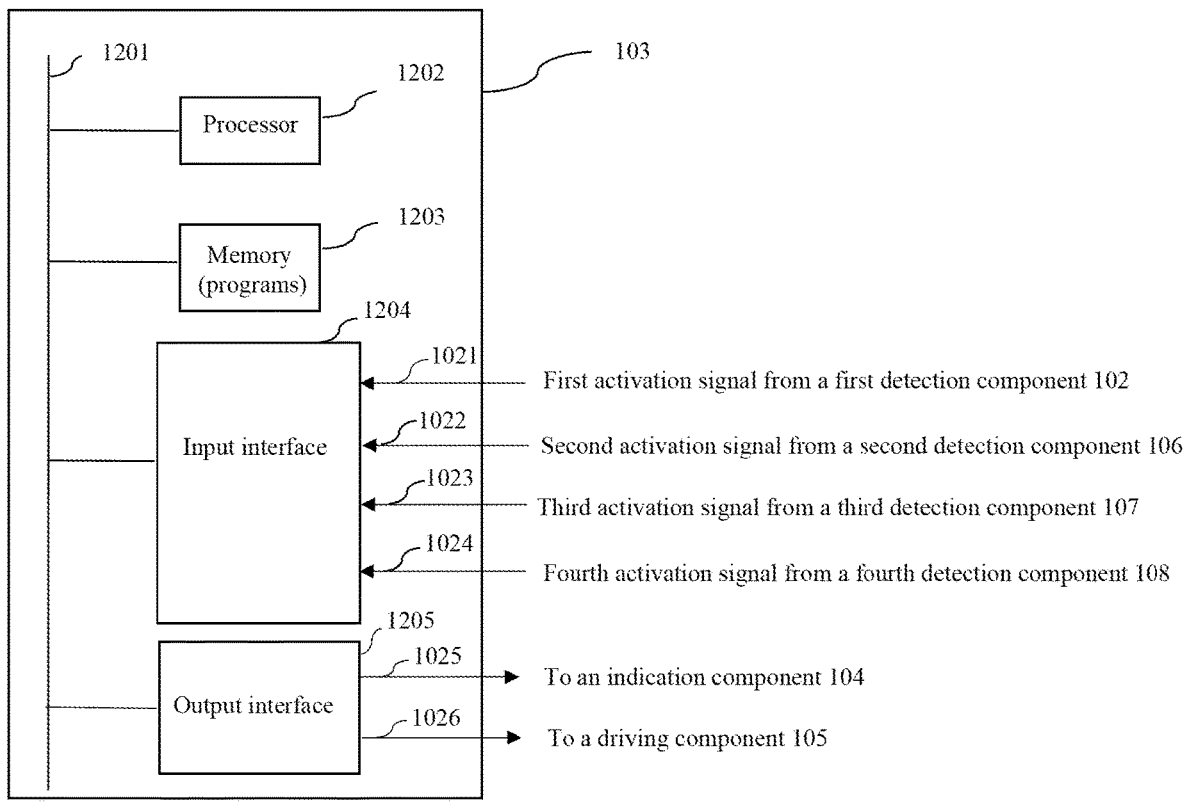
FIG. 12 shows a block diagram according to a control component shown in FIG. 11.

FIG. 12 shows a block diagram according to a control component 103 shown in FIG. 11. As shown in FIG. 12, the control component 103 includes a bus 1201, a processor 1202, a memory 1203, an input interface 1204, and an output interface 1205. The processor 1202, the memory 1203, the input interface 1204, and the output interface 1205 are connected to the bus 1201. The processor 1202 may read programs (or instructions) from the memory 1203 and execute the programs (or the instructions) to process data and control the driving component 105 and the indication component 104. The processor 1202 may further write data or programs (or instructions) into the memory 1203. The memory 1203 may store the programs (instructions) or the data. By executing the instructions in the memory 1203, the processor 1202 can control the memory 1203, the input interface 1204, and the output interface 1205. In an embodiment, the control component 103 may be a general control component of the vehicle, and further includes other processing and control functions.

When the first detection component 102 detects that the user touches or presses the sensing area 111, the first detection component 102 sends out an activation signal. The input interface 1204 is configured to receive the activation signal from the first detection component 102 through the connection line 1021. The processor 1202 is configured to generate a first control signal according to the activation signal received from the first detection component 102. The output interface 1205 is configured to receive the first control signal from the processor 1202, convert the first control signal into an indication control signal suitable for the indication component 104, and send to the indication component 104 the indication control signal through the connection line 1025. When the indication control signal has been received, the indication component 104 send outs an aperture tube door status indication.

The processor 1202 is further configured to generate a second control signal according to the activation signal received from the first detection component 102. The output interface 1205 is configured to receive the second control signal from the processor 1202 and convert the second control signal into a driving control signal. The driving control signal is used to open the aperture tube door 101. In another embodiment, the output interface 1205 is configured to receive the second control signal from the processor 1202, convert the second control signal into a driving control signal suitable for the driving component 105, and send to the driving component 105 the driving control signal through the connection line 1026. When the driving control signal has been received, the driving component 105 drives the aperture tube door 101 to open.

When the second detection component 106 detects that the aperture tube door 101 is opened, the second detection component 106 sends out a second activation signal. The input interface 1204 is configured to receive the second activation signal from the second detection component 106 through the connection line 1022. The processor 1202 is configured to generate a control signal according to the second activation signal received from the second detection component 106. The output interface 1205 is configured to receive the control signal from the processor 1202, convert the control signal into a lighting control signal suitable for the indication component 104, and send to the indication component 104 the lighting control signal through the connection line 1025. When the lighting control signal has been received, the indication component 104 provides lighting. In another embodiment, when the second detection component 106 detects the driving of the driving component 105, the second detection component 106 sends to the control component 103 a second activation signal through the connection line 1022.

The third detection component 107 sends out a third activation signal when the connection between the charging head and the charging port is detected. The input interface 1204 is configured to receive the third activation signal from the third detection component 107 through the connection line 1023. The processor 1202 is configured to generate a control signal according to the third activation signal received from the third detection component 107. The output interface 1205 is configured to receive the control signal from the processor 1202, convert the control signal into a charging indication control signal suitable for the indication component 104, and send to the indication component 104 the charging indication control signal through the connection line 1025. When the charging indication control signal has been received, the indication component 104 send outs a charging prompt.

The fourth detection component 108 sends out a fourth activation signal when completion of the charging is detected. The input interface 1204 is configured to receive the fourth activation signal from the fourth detection component 108 through the connection line 1024. The processor 1202 is configured to generate a control signal according to the fourth activation signal received from the fourth detection component 108. The output interface 1205 is configured to receive the control signal from the processor 1202, convert the control signal into a charging completion indication control signal suitable for the indication component 104, and send to the indication component 104 the charging completion indication control signal through the connection line 1025. When the charging completion indication control signal has been received, the indication component 104 send outs a charging completion prompt.

Figure 13:
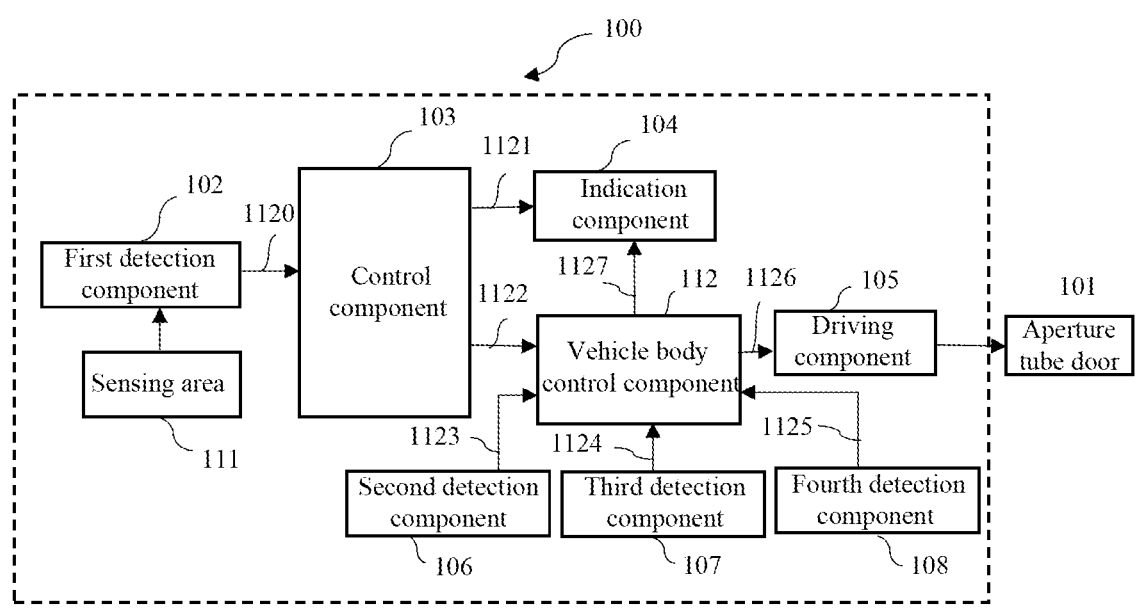
FIG. 13 shows a block diagram of functional modules of a fourth embodiment of a system for controlling opening of an aperture tube door according to the present disclosure.

FIG. 13 shows a block diagram of functional modules of a fourth embodiment of a system 100 for controlling opening of an aperture tube door 101 according to the present disclosure. As shown in FIG. 13, the system 100 includes a sensing area 111, a first detection component 102, a control component 103, an indication component 104, a vehicle body control component 112 and a driving component 105. The first detection component 102 is connected to the control component 103 via a connection line 1120. The control component 103 is connected to the indication component 104 via a connection line 1121, and the control component 103 is also connected to the vehicle body control component 112 via a connection line 1122. The vehicle body control component 112 is connected to the driving component 105 via a connection line 1126. The operations of the sensing area 111, the first detection component 102, the control component 103, the indication component 104, the vehicle body control component 112 and the driving component 105 in FIG. 13 are substantially the same as those of the sensing area 111, the detection component 102, the control component 103, the indication component 104, the vehicle body control component 112 and the driving component 105 in FIG. 2.

The difference from FIG. 2 is that the system 100 in FIG. 13 further includes a second detection component 106, a third detection component 107 and a fourth detection component 108. The second detection component 106, the third detection component 107 and the fourth detection component 108 are respectively connected to the vehicle body control component 112 via connection lines 1123, 1124, 1125, and the vehicle body control component 112 is connected to the indication component 104 via a connection line 1127. The operations of the second detection component 106, the third detection component 107 and the fourth detection component 108 in FIG. 13 are substantially the same as those of the second detection component 106, the third detection component 107 and the fourth detection component 108 in FIG. 11. The difference is that the second detection component 106, the third detection component 107 and the fourth detection component 108 in FIG. 13 are connected to the vehicle body control component 112 and transmit data and/or signals to the vehicle body control component 112, and the vehicle body control component 112 is connected to the indication component 104 and the driving component 105 and controls the indication component 104 and the driving component 105 to perform related operations. However, the second detection component 106, the third detection component 107 and the fourth detection component 108 in FIG. 11 are connected to the control component 103 and transmit data and/or signals to the control component 103, and the control component 103 is connected to the indication component 104 and the driving component 105 and controls the indication component 104 and the driving component 105 to perform related operations.

Specifically, as shown in FIG. 13, in operation, when the second detection component 106 detects that the aperture tube door 101 is opened, the second detection component 106 sends to the vehicle body control component 112 a second activation signal through the connection line 1123. When the vehicle body control component 112 receives the second activation signal, the vehicle body control component 112 sends to the indication component 104 a lighting control signal through the connection line 1127 to control the indication component 104 to provide lighting. In another embodiment, when the second detection component 106 detects the driving of the driving component 105, the second detection component 106 sends to the vehicle body control component 112 a second activation signal through the connection line 1123.

When the third detection component 107 detects that the charging head is connecting with the charging port, the third detection component 107 sends to the vehicle body control component 112 a third activation signal through the connection line 1124. When the vehicle body control component 112 receives the third activation signal, the vehicle body control component 112 sends to the indication component 104 an indication control signal through the connection line 1127 to control the indication component 104 to send out a charging prompt. When the fourth detection component 108 detects that the charging is completed, the fourth detection component 108 sends to the vehicle body control component 112 a fourth activation signal through the connection line 1125. When the vehicle body control component 112 receives the fourth activation signal, the vehicle body control component 112 sends to the indication component 104 an indication control signal through the connection line 1127 to control the indication component 104 to send out a charging completion prompt.

Figure 14:
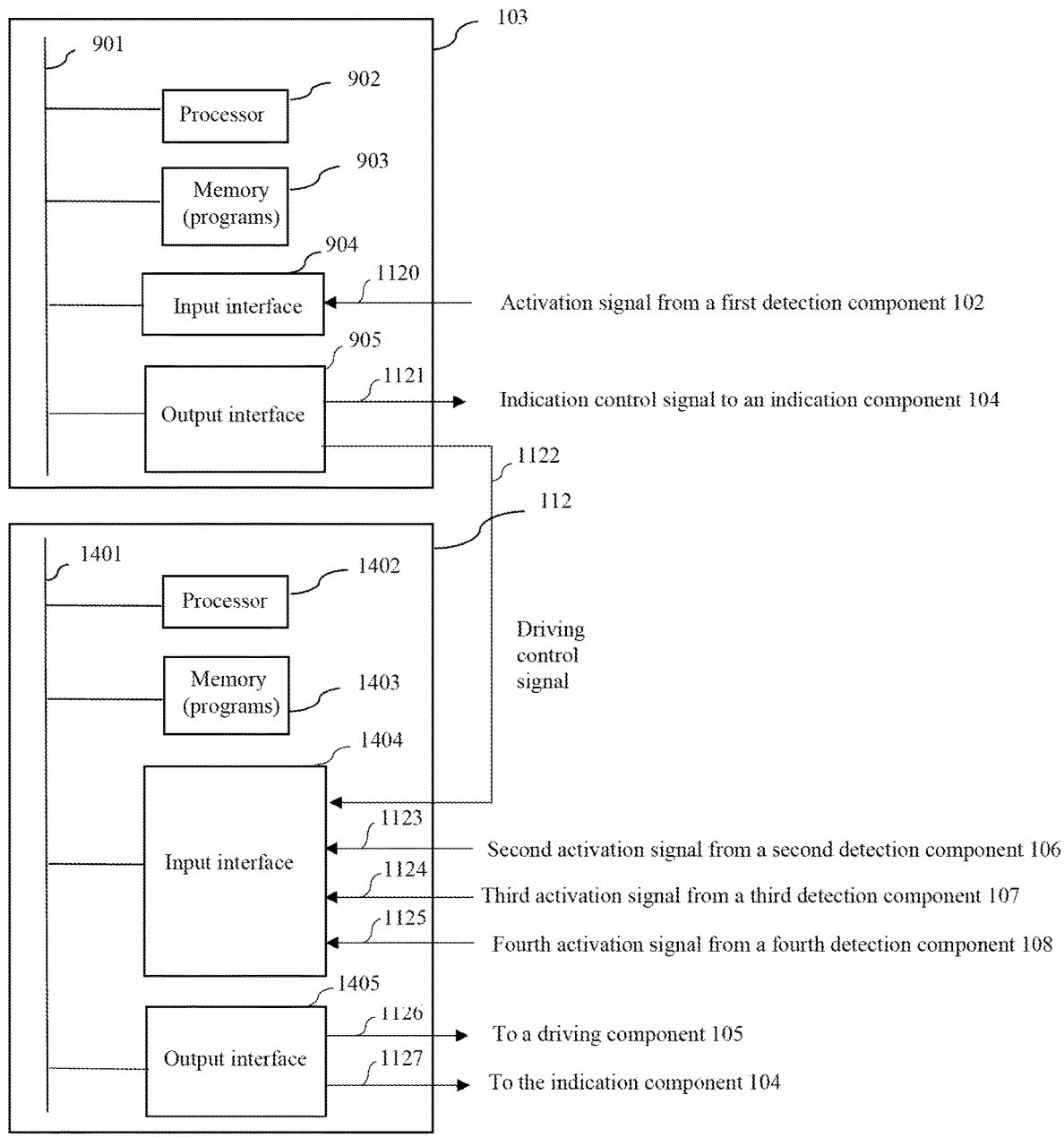
FIG. 14 shows a block diagram according to a control component and a vehicle body control component shown in FIG. 13.

FIG. 14 shows a block diagram according to a control component 103 and a vehicle body control component 112 shown in FIG. 13. As shown in FIG. 14, the control component 103 includes a bus 901, a processor 902, a memory 903, an input interface 904, and an output interface 905. The processor 902, the memory 903, the input interface 904, and the output interface 905 are connected to the bus 901. The processor 902 may read programs (or instructions) from the memory 903 and execute the programs (or the instructions) to process data and control the indication component 104 and the vehicle body control component 112. The processor 902 may further write data or programs (or instructions) into the memory 903. The memory 903 may store the programs (instructions) or the data. By executing the instructions in the memory 903, the processor 902 can control the memory 903, the input interface 904, and the output interface 905.

As shown in FIG. 14, the vehicle body control component 112 includes a bus 1401, a processor 1402, a memory 1403, an input interface 1404, and an output interface 1405. The processor 1402, the memory 1403, the input interface 1404, and the output interface 1405 are connected to the bus 1401. The processor 1402 may read programs (or instructions) from the memory 1403 and execute the programs (or the instructions) to process data and control the indication component 104 and the driving component 105. The processor 1402 may further write data or programs (or instructions) into the memory 1403. The memory 1403 may store the programs (instructions) or the data. By executing the instructions in the memory 1403, the processor 1402 can control the memory 1403, the input interface 1404, and the output interface 1405.

When the first detection component 102 detects that the user touches or presses the sensing area 111, the first detection component 102 sends out a first activation signal. The input interface 904 is configured to receive the first activation signal from the first detection component 102 through the connection line 1120. The processor 902 is configured to generate a first control signal according to the first activation signal received from the first detection component 102. The output interface 905 is configured to receive the first control signal from the processor 902, convert the first control signal into an indication control signal suitable for the indication component 104, and send to the indication component 104 the indication control signal through the connection line 1121. When the indication control signal is received, the indication component 104 send outs an aperture tube door status indication. The processor 902 is further configured to generate a second control signal according to the activation signal received from the first detection component 102. The output interface 905 is configured to receive the second control signal from the processor 902, convert the second control signal into a driving control signal suitable for the vehicle body control component 112, and send to the vehicle body control component 112 the driving control signal through the connection line 1122.

The input interface 1404 of the vehicle body control component 112 is configured to receive the driving control signal from the control component 103 through the connection line 1122. The processor 1402 of the vehicle body control component 112 is configured to generate a third control signal according to the driving control signal received from the control component 103. The output interface 1405 of the vehicle body control component 112 is configured to receive the third control signal from the processor 1402, convert the third control signal into a driving component control signal suitable for the driving component 105, and send to the driving component 105 the driving component control signal through the connection line 1126. When the driving component control signal has been received, the driving component 105 drives the aperture tube door 101 to open.

When the second detection component 106 detects that the aperture tube door 101 is opened, the second detection component 106 sends out a second activation signal. The input interface 1404 is configured to receive the second activation signal from the second detection component 106 through the connection line 1123. The processor 1402 is configured to generate a fourth control signal according to the second activation signal received from the second detection component 106. The output interface 1405 is configured to receive the fourth control signal from the processor 1402, convert the fourth control signal into a lighting control signal suitable for the indication component 104, and send to the indication component 104 the lighting control signal through the connection line 1127. When the lighting control signal has been received, the indication component 104 provides lighting. In another embodiment, when the second detection component 106 detects the driving of the driving component 105, the second detection component 106 sends to the input interface 1404 of the vehicle body control component 112 a second activation signal through the connection line 1123.

The third detection component 107 sends out a third activation signal when the connection between the charging head and the charging port is detected. The input interface 1404 is configured to receive the third activation signal from the third detection component 107 through the connection line 1124. The processor 1402 is configured to generate a fifth control signal according to the third activation signal received from the third detection component 107. The output interface 1405 is configured to receive the fifth control signal from the processor 1402, convert the fifth control signal into a charging indication control signal suitable for the indication component 104, and send to the indication component 104 the charging indication control signal through the connection line 1127. When the charging indication control signal has been received, the indication component 104 send outs a charging prompt.

The fourth detection component 108 sends out a fourth activation signal when the charging being completed is detected. The input interface 1404 is configured to receive the fourth activation signal from the fourth detection component 108 through the connection line 1125. The processor 1402 is configured to generate a sixth control signal according to the fourth activation signal received from the fourth detection component 108. The output interface 1405 is configured to receive the sixth control signal from the processor 1402, convert the sixth control signal into a charging completion indication control signal suitable for the indication component 104, and send to the indication component 104 the charging completion indication control signal through the connection line 1127. When the charging completion indication control signal has been received, the indication component 104 send outs a charging completion prompt.

In an embodiment, the system 100 described above may be used in a vehicle. The vehicle includes an aperture tube door 101 and the system 100.

Although the present disclosure is described in conjunction with the examples of embodiments outlined above, various alternatives, modifications, variations, improvements, and/or substantial equivalents that are known or current or to be anticipated before long may be obvious to those of at least ordinary skill in the art. Accordingly, the examples of the embodiments of the present disclosure as set forth above are intended to be illustrative rather than limiting. Various changes may be made without departing from the spirit or scope of the present disclosure. Therefore, the present disclosure is intended to embrace all known or earlier disclosed alternatives, modifications, variations, improvements, and/or substantial equivalents. The technical effects and technical problems in this specification are exemplary rather than limiting. It should be noted that the embodiments described in this specification may have other technical effects and can solve other technical problems.

I claim:

1. A system for controlling opening of an aperture tube door, comprising:
    a control component,
    a detection component connected to the control component,
    a sensing area, when detecting a sensing signal from the sensing area, the detection component sending out an activation signal,
    an indication component connected to the control component,
    wherein, when the activation signal has been received, the control component sends to the indication component an indication control signal to control the indication component to send out an aperture tube door status prompt, and the control component sends out a driving control signal configured to open the aperture tube door,
    wherein the aperture tube door status prompt comprises a visual prompt or a sound prompt, the aperture tube door status prompt can be sensed when the aperture tube door is in a closed position during actuation of the aperture tube door,
    wherein the indication component comprises a light emitting element,
    wherein the light emitting element comprises at least one light emitting diode and a light guide band connected to the at least one light emitting diode, and
    wherein the light emitting element is arranged around the aperture tube door and is used to seal the aperture tube door, or the light emitting element is arranged around an aperture tube and is used to seal the aperture tube.

2. The system of claim 1, further comprising:
    a driving component connected to the control component, the control component sending to the driving component a driving control signal to control the driving component to open the aperture tube door.

3. The system of claim 1, for use in a vehicle, the vehicle comprising:
    a vehicle body control component and a driving component,
    the control component sending a driving control signal to the vehicle body control component, the vehicle body control component driving the driving component to open the aperture tube door according to the driving control signal.

4. The system of claim 1, wherein the aperture tube door status prompt comprises a visual prompt or a sound prompt, the aperture tube door status prompt can be sensed when the aperture tube door is in a closed position during actuation of the aperture tube door.

5. The system of claim 2, wherein the control component is configured to control a speed at which the driving component opens the aperture tube door.

6. The system of claim 1, wherein the sensing area is arranged on or close to the aperture tube door.

7. The system of claim 1, wherein the aperture tube door comprises an oil filler door or a charging port door.

8. The system of claim 3, wherein the detection component, the indication component and the control component are integrated.

9. The system of claim 3, further comprising a second detection component connected to the vehicle body control component, the second detection component being used for detecting opening of the aperture tube door and being arranged on the aperture tube door,
    wherein, the second detection component sends out a second activation signal when the opening of the aperture tube door is detected, and when the second activation signal has been received, the vehicle body control component sends to the indication component a lighting control signal to control the indication component to provide lighting, the indication component provides lighting after the indication component sends out an aperture tube door status prompt.

10. The system of claim 3, further comprising a second detection component connected to the vehicle body control component, the second detection component being used for detecting driving of the driving component and being arranged on the driving component, wherein, the second detection component sends out a second activation signal when the driving of the driving component is detected, and when receiving the second activation signal, the vehicle body control component sends to the indication component a lighting control signal to control the indication component to provide lighting, the indication component provides lighting after the indication component sends out an aperture tube door status prompt.

11. The system of claim 3, wherein the aperture tube door comprises a charging port door, the system further comprises a third detection component connected to the vehicle body control component, the third detection component being used for detecting a charging connection between a charging head and a charging port,
wherein, the third detection component sends out a third activation signal when the charging connection between the charging head and the charging port is detected, and when receiving the third activation signal, the vehicle body control component sends to the indication component an indication control signal to control the indication component to send out a charging prompt.

12. The system of claim 11, further comprising a fourth detection component connected to the vehicle body control component, the fourth detection component being used for detecting whether charging has been completed,
wherein, the fourth detection component sends out a fourth activation signal when completion of the charging has been detected, and when receiving the fourth activation signal, the vehicle body control component sends to the indication component an indication control signal to control the indication component to send out a charging completion prompt.

13. A vehicle, comprising:
an aperture tube door, and
the system for controlling opening of the aperture tube door of claim 1.

14. A system for controlling opening of an aperture tube door, comprising:
a control component,
a detection component connected to the control component,
a sensing area, when detecting a sensing signal from the sensing area, the detection component sending out an activation signal,
an indication component connected to the control component,
a vehicle body control component and a driving component, the control component sending a driving control signal to the vehicle body control component, the vehicle body control component driving the driving component to open the aperture tube door according to the driving control signal,
a second detection component connected to the vehicle body control component, the second detection component being used for detecting opening of the aperture tube door and being arranged on the aperture tube door,
wherein, when the activation signal has been received, the control component sends to the indication component an indication control signal to control the indication component to send out an aperture tube door status prompt, and the control component sends out a driving control signal configured to open the aperture tube door, and
wherein, the second detection component sends out a second activation signal when the opening of the aperture tube door is detected, and when the second activation signal has been received, the vehicle body control component sends to the indication component a lighting control signal to control the indication component to provide lighting, the indication component provides lighting after the indication component sends out an aperture tube door status prompt.

15. The system of claim 14, wherein the aperture tube door comprises a charging port door, the system further comprises a third detection component connected to the vehicle body control component, the third detection component being used for detecting a charging connection between a charging head and a charging port,
wherein, the third detection component sends out a third activation signal when the charging connection between the charging head and the charging port is detected, and when receiving the third activation signal, the vehicle body control component sends to the indication component an indication control signal to control the indication component to send out a charging prompt.

16. The system of claim 15, further comprising a fourth detection component connected to the vehicle body control component, the fourth detection component being used for detecting whether charging has been completed,
wherein, the fourth detection component sends out a fourth activation signal when completion of the charging has been detected, and when receiving the fourth activation signal, the vehicle body control component sends to the indication component an indication control signal to control the indication component to send out a charging completion prompt.

17. A vehicle, comprising:
an aperture tube door, and
the system for controlling opening of the aperture tube door of claim 14.

18. A system for controlling opening of an aperture tube door, comprising:
a control component,
a detection component connected to the control component,
a sensing area, when detecting a sensing signal from the sensing area, the detection component sending out an activation signal,
an indication component connected to the control component,
wherein, when the activation signal has been received, the control component sends to the indication component an indication control signal to control the indication component to send out an aperture tube door status prompt, and the control component sends out a driving control signal configured to open the aperture tube door,
a vehicle body control component and a driving component, and
the control component sending a driving control signal to the vehicle body control component, the vehicle body control component driving the driving component to open the aperture tube door according to the driving control signal,
wherein the aperture tube door comprises a charging port door, the system further comprises a third detection component connected to the vehicle body control component, the third detection component being used for detecting a charging connection between a charging head and a charging port, and wherein, the third detection component sends out a third activation signal when the charging connection between the charging head and the charging port is detected, and when receiving the third activation signal, the vehicle body control component sends to the indication component an indication control signal to control the indication component to send out a charging prompt.

19. The system of claim 18, further comprising a fourth detection component connected to the vehicle body control component, the fourth detection component being used for detecting whether charging has been completed, wherein, the fourth detection component sends out a fourth activation signal when completion of the charging has been detected, and when receiving the fourth activation signal, the vehicle body control component sends to the indication component an indication control signal to control the indication component to send out a charging completion prompt.

20. A vehicle, comprising:

an aperture tube door, and the system for controlling opening of the aperture tube door of claim 18.

\* \* \* \* \*